United States Patent
Bloch et al.

(10) Patent No.: US 12,549,818 B2
(45) Date of Patent: Feb. 10, 2026

(54) SHADER-BASED DYNAMIC VIDEO MANIPULATION

(71) Applicant: JBF Interlude 2009 LTD, Tel Aviv (IL)

(72) Inventors: Jonathan Bloch, Tel Aviv (IL); Tal Zubalsky, Brooklyn, NY (US); Yuval Hofshy, Kfar Saba (IL); Alon Benari, Brooklyn, NY (US); Tomer Lahav, Brooklyn, NY (US); Max Goz, Tel Aviv (IL); Divya Mahadevan, East Greenwich, RI (US)

(73) Assignee: JBF Interlude 2009 LTD, Tel Aviv (IL)

( * ) Notice: Subject to any disclaimer, the term of this patent is extended or adjusted under 35 U.S.C. 154(b) by 0 days.

(21) Appl. No.: 17/462,222

(22) Filed: Aug. 31, 2021

(65) Prior Publication Data
US 2023/0076000 A1  Mar. 9, 2023

(51) Int. Cl.
| H04N 21/431 | (2011.01) |
| G06F 3/04845 | (2022.01) |
| H04N 21/472 | (2011.01) |
| H04N 21/485 | (2011.01) |
| H04N 21/81 | (2011.01) |

(52) U.S. Cl.
CPC ... *H04N 21/47205* (2013.01); *G06F 3/04845* (2013.01); *H04N 21/4318* (2013.01); *H04N 21/4858* (2013.01); *H04N 21/8153* (2013.01)

(58) Field of Classification Search
CPC ......... H04N 21/4318; H04N 21/47205; H04N 21/4858; H04N 21/8153
See application file for complete search history.

(56) References Cited

U.S. PATENT DOCUMENTS

| 4,569,026 A | 2/1986 | Best |
| 5,137,277 A | 8/1992 | Kitaue |

(Continued)

FOREIGN PATENT DOCUMENTS

| CA | 2639491 A1 | 3/2010 |
| DE | 2428329 A1 | 1/1975 |

(Continued)

OTHER PUBLICATIONS

An ffmpeg and SDL Tutorial, "Tutorial 05: Synching Video," Retrieved from internet on Mar. 15, 2013: <http://dranger.com/ffmpeg/tutorial05.html>, 4 pages.

(Continued)

*Primary Examiner* — Pinkal R Chokshi
(74) *Attorney, Agent, or Firm* — Goodwin Procter LLP

(57) ABSTRACT

Real-time video manipulation techniques include performing shader-based graphical operations on user interface elements based on the state of an interactive video and the properties associated with the user interface elements at the state. The user interface elements are rendered into frames of the interactive video, and transparent interactive elements are layered over the user interface elements. In another technique, video frames in an interactive video include viewable and non-viewable regions. While the video is playing, the viewable regions are modified based on information in the non-viewable regions, thereby generating modified versions of the video frames.

20 Claims, 12 Drawing Sheets

(56) References Cited

U.S. PATENT DOCUMENTS

| | | |
|---|---|---|
| 5,161,034 A | 11/1992 | Klappert |
| 5,568,602 A | 10/1996 | Callahan et al. |
| 5,568,603 A | 10/1996 | Chen et al. |
| 5,597,312 A | 1/1997 | Bloom et al. |
| 5,607,356 A | 3/1997 | Schwartz |
| 5,610,653 A | 3/1997 | Abecassis |
| 5,636,036 A | 6/1997 | Ashbey |
| 5,676,551 A | 10/1997 | Knight et al. |
| 5,694,163 A | 12/1997 | Harrison |
| 5,715,169 A | 2/1998 | Noguchi |
| 5,734,862 A | 3/1998 | Kulas |
| 5,737,527 A | 4/1998 | Shiels et al. |
| 5,745,738 A | 4/1998 | Ricard |
| 5,751,953 A | 5/1998 | Shiels et al. |
| 5,754,770 A | 5/1998 | Shiels et al. |
| 5,818,435 A | 10/1998 | Kozuka et al. |
| 5,848,934 A | 12/1998 | Shiels et al. |
| 5,887,110 A | 3/1999 | Sakamoto et al. |
| 5,894,320 A | 4/1999 | Vancelette |
| 5,956,037 A | 9/1999 | Osawa et al. |
| 5,966,121 A | 10/1999 | Hubbell et al. |
| 5,983,190 A | 11/1999 | Trower, II et al. |
| 6,067,400 A | 5/2000 | Saeki et al. |
| 6,091,886 A | 7/2000 | Abecassis |
| 6,122,668 A | 9/2000 | Teng et al. |
| 6,128,712 A | 10/2000 | Hunt et al. |
| 6,191,780 B1 | 2/2001 | Martin et al. |
| 6,222,925 B1 | 4/2001 | Shiels et al. |
| 6,240,555 B1 | 5/2001 | Shoff et al. |
| 6,298,020 B1 | 10/2001 | Kumagami |
| 6,298,482 B1 | 10/2001 | Seidman et al. |
| 6,460,036 B1 | 10/2002 | Herz |
| 6,535,639 B1 | 3/2003 | Uchihachi et al. |
| 6,657,906 B2 | 12/2003 | Martin |
| 6,698,020 B1 | 2/2004 | Zigmond et al. |
| 6,728,477 B1 | 4/2004 | Watkins |
| 6,771,875 B1 | 8/2004 | Kunieda et al. |
| 6,801,947 B1 | 10/2004 | Li |
| 6,947,966 B1 | 9/2005 | Oko, Jr. et al. |
| 7,085,844 B2 | 8/2006 | Thompson |
| 7,155,676 B2 | 12/2006 | Land et al. |
| 7,231,132 B1 | 6/2007 | Davenport |
| 7,296,231 B2 | 11/2007 | Loui et al. |
| 7,310,784 B1 | 12/2007 | Gottlieb et al. |
| 7,319,780 B2 | 1/2008 | Fedorovskaya et al. |
| 7,379,653 B2 | 5/2008 | Yap et al. |
| 7,430,360 B2 | 9/2008 | Abecassis |
| 7,444,069 B1 | 10/2008 | Bernsley |
| 7,472,910 B1 | 1/2009 | Okada et al. |
| 7,627,605 B1 | 12/2009 | Lamere et al. |
| 7,650,623 B2 | 1/2010 | Hudgeons et al. |
| 7,669,128 B2 | 2/2010 | Bailey et al. |
| 7,694,320 B1 | 4/2010 | Yeo et al. |
| 7,779,438 B2 | 8/2010 | Davies |
| 7,787,973 B2 | 8/2010 | Lambert |
| 7,917,505 B2 | 3/2011 | van Gent et al. |
| 8,024,762 B2 | 9/2011 | Britt |
| 8,046,801 B2 | 10/2011 | Ellis et al. |
| 8,065,710 B2 | 11/2011 | Malik |
| 8,151,139 B1 | 4/2012 | Gordon |
| 8,176,425 B2 | 5/2012 | Wallace et al. |
| 8,190,001 B2 | 5/2012 | Bernsley |
| 8,202,167 B2 | 6/2012 | Ackley et al. |
| 8,276,058 B2 | 9/2012 | Gottlieb et al. |
| 8,281,355 B1 | 10/2012 | Weaver et al. |
| 8,321,905 B1 | 11/2012 | Streeter et al. |
| 8,341,662 B1 | 12/2012 | Bassett et al. |
| 8,350,908 B2 | 1/2013 | Morris et al. |
| 8,405,706 B2 | 3/2013 | Zhang et al. |
| 8,600,220 B2 | 12/2013 | Bloch et al. |
| 8,612,517 B1 | 12/2013 | Yadid et al. |
| 8,626,337 B2 | 1/2014 | Corak et al. |
| 8,646,020 B2 | 2/2014 | Reisman |
| 8,650,489 B1 | 2/2014 | Baum et al. |
| 8,667,395 B2 | 3/2014 | Hosogai et al. |
| 8,750,682 B1 | 6/2014 | Nicksay et al. |
| 8,752,087 B2 | 6/2014 | Begeja et al. |
| 8,826,337 B2 | 9/2014 | Issa et al. |
| 8,860,882 B2 | 10/2014 | Bloch et al. |
| 8,930,975 B2 | 1/2015 | Woods et al. |
| 8,977,113 B1 | 3/2015 | Rumteen et al. |
| 9,009,619 B2 | 4/2015 | Bloch et al. |
| 9,021,537 B2 | 4/2015 | Funge et al. |
| 9,078,048 B1 * | 7/2015 | Gargi ................ H04N 21/2668 |
| 9,082,092 B1 | 7/2015 | Henry |
| 9,094,718 B2 | 7/2015 | Barton et al. |
| 9,190,110 B2 | 11/2015 | Bloch |
| 9,257,148 B2 | 2/2016 | Bloch et al. |
| 9,268,774 B2 | 2/2016 | Kim et al. |
| 9,271,015 B2 | 2/2016 | Bloch et al. |
| 9,363,464 B2 | 6/2016 | Alexander |
| 9,367,196 B1 | 6/2016 | Goldstein et al. |
| 9,374,411 B1 | 6/2016 | Goetz |
| 9,390,099 B1 | 7/2016 | Wang et al. |
| 9,456,247 B1 | 9/2016 | Pontual et al. |
| 9,465,435 B1 | 10/2016 | Zhang et al. |
| 9,473,582 B1 | 10/2016 | Fraccaroli |
| 9,497,496 B1 | 11/2016 | Corley et al. |
| 9,510,044 B1 | 11/2016 | Pereira et al. |
| 9,520,155 B2 | 12/2016 | Bloch et al. |
| 9,530,454 B2 | 12/2016 | Bloch et al. |
| 9,531,998 B1 | 12/2016 | Farrell et al. |
| 9,538,219 B2 | 1/2017 | Sakata et al. |
| 9,554,061 B1 | 1/2017 | Proctor, Jr. et al. |
| 9,571,877 B2 | 2/2017 | Lee et al. |
| 9,607,655 B2 | 3/2017 | Bloch et al. |
| 9,641,898 B2 | 5/2017 | Bloch et al. |
| 9,653,115 B2 | 5/2017 | Bloch et al. |
| 9,653,116 B2 | 5/2017 | Paulraj et al. |
| 9,672,868 B2 | 6/2017 | Bloch et al. |
| 9,715,901 B1 | 7/2017 | Singh et al. |
| 9,736,503 B1 | 8/2017 | Bakshi et al. |
| 9,792,026 B2 | 10/2017 | Bloch et al. |
| 9,792,957 B2 | 10/2017 | Bloch et al. |
| 9,826,285 B1 | 11/2017 | Mishra et al. |
| 9,967,621 B2 | 5/2018 | Armstrong et al. |
| 10,070,192 B2 | 9/2018 | Baratz |
| 10,178,304 B1 | 1/2019 | Tudor et al. |
| 10,178,421 B2 | 1/2019 | Thomas et al. |
| 10,187,687 B2 | 1/2019 | Harb et al. |
| 10,194,189 B1 | 1/2019 | Goetz et al. |
| 10,257,572 B2 | 4/2019 | Manus et al. |
| 10,257,578 B1 | 4/2019 | Bloch et al. |
| 10,310,697 B2 | 6/2019 | Roberts et al. |
| 10,419,790 B2 | 9/2019 | Gersten |
| 10,460,765 B2 | 10/2019 | Bloch et al. |
| 10,523,982 B2 | 12/2019 | Oyman |
| 10,771,824 B1 | 9/2020 | Haritaoglu et al. |
| 10,856,049 B2 | 12/2020 | Bloch et al. |
| 11,003,748 B2 | 5/2021 | Oliker et al. |
| 2001/0056427 A1 | 12/2001 | Yoon et al. |
| 2002/0019799 A1 | 2/2002 | Ginsberg et al. |
| 2002/0029218 A1 | 3/2002 | Bentley et al. |
| 2002/0053089 A1 | 5/2002 | Massey |
| 2002/0086724 A1 | 7/2002 | Miyaki et al. |
| 2002/0089523 A1 | 7/2002 | Hodgkinson |
| 2002/0091455 A1 | 7/2002 | Williams |
| 2002/0105535 A1 | 8/2002 | Wallace et al. |
| 2002/0106191 A1 | 8/2002 | Betz et al. |
| 2002/0120456 A1 | 8/2002 | Berg et al. |
| 2002/0120931 A1 | 8/2002 | Huber et al. |
| 2002/0124250 A1 | 9/2002 | Proehl et al. |
| 2002/0129374 A1 | 9/2002 | Freeman et al. |
| 2002/0140719 A1 | 10/2002 | Amir et al. |
| 2002/0144262 A1 | 10/2002 | Plotnick et al. |
| 2002/0174430 A1 | 11/2002 | Ellis et al. |
| 2002/0177914 A1 | 11/2002 | Chase |
| 2002/0194595 A1 | 12/2002 | Miller et al. |
| 2003/0007560 A1 | 1/2003 | Mayhew et al. |
| 2003/0012409 A1 | 1/2003 | Overton et al. |
| 2003/0020744 A1 | 1/2003 | Ellis et al. |
| 2003/0023757 A1 | 1/2003 | Ishioka et al. |
| 2003/0039471 A1 | 2/2003 | Hashimoto |
| 2003/0069057 A1 | 4/2003 | DeFrees-Parrott |

(56) References Cited

U.S. PATENT DOCUMENTS

| | | |
|---|---|---|
| 2003/0076347 A1 | 4/2003 | Barrett et al. |
| 2003/0101164 A1 | 5/2003 | Pic et al. |
| 2003/0148806 A1 | 8/2003 | Weiss |
| 2003/0159566 A1 | 8/2003 | Sater et al. |
| 2003/0183064 A1 | 10/2003 | Eugene et al. |
| 2003/0184598 A1 | 10/2003 | Graham |
| 2003/0221541 A1 | 12/2003 | Platt |
| 2004/0009813 A1 | 1/2004 | Wind |
| 2004/0019905 A1 | 1/2004 | Fellenstein et al. |
| 2004/0034711 A1 | 2/2004 | Hughes |
| 2004/0070595 A1 | 4/2004 | Atlas et al. |
| 2004/0091848 A1 | 5/2004 | Nemitz |
| 2004/0125124 A1 | 7/2004 | Kim et al. |
| 2004/0128317 A1 | 7/2004 | Sull et al. |
| 2004/0138948 A1 | 7/2004 | Loomis |
| 2004/0146275 A1 | 7/2004 | Takata et al. |
| 2004/0172476 A1 | 9/2004 | Chapweske |
| 2004/0194128 A1 | 9/2004 | McIntyre et al. |
| 2004/0194131 A1 | 9/2004 | Ellis et al. |
| 2004/0199923 A1 | 10/2004 | Russek |
| 2004/0261127 A1 | 12/2004 | Freeman et al. |
| 2005/0019015 A1 | 1/2005 | Ackley et al. |
| 2005/0028193 A1 | 2/2005 | Candelore et al. |
| 2005/0055377 A1 | 3/2005 | Dorey et al. |
| 2005/0091597 A1 | 4/2005 | Ackley |
| 2005/0102707 A1 | 5/2005 | Schnitman |
| 2005/0107159 A1 | 5/2005 | Sato |
| 2005/0120389 A1 | 6/2005 | Boss et al. |
| 2005/0132401 A1 | 6/2005 | Boccon-Gibod et al. |
| 2005/0166224 A1 | 7/2005 | Ficco |
| 2005/0198661 A1 | 9/2005 | Collins et al. |
| 2005/0210145 A1 | 9/2005 | Kim et al. |
| 2005/0240955 A1 | 10/2005 | Hudson |
| 2005/0251820 A1 | 11/2005 | Stefanik et al. |
| 2005/0251827 A1 | 11/2005 | Ellis et al. |
| 2005/0289582 A1 | 12/2005 | Tavares et al. |
| 2006/0002895 A1 | 1/2006 | McDonnell et al. |
| 2006/0024034 A1 | 2/2006 | Filo et al. |
| 2006/0028951 A1 | 2/2006 | Tozun et al. |
| 2006/0064733 A1 | 3/2006 | Norton et al. |
| 2006/0080167 A1 | 4/2006 | Chen et al. |
| 2006/0089843 A1 | 4/2006 | Flather |
| 2006/0120624 A1 | 6/2006 | Jojic et al. |
| 2006/0130121 A1 | 6/2006 | Candelore et al. |
| 2006/0150072 A1 | 7/2006 | Salvucci |
| 2006/0150216 A1 | 7/2006 | Herz et al. |
| 2006/0153537 A1 | 7/2006 | Kaneko et al. |
| 2006/0155400 A1 | 7/2006 | Loomis |
| 2006/0200842 A1 | 9/2006 | Chapman et al. |
| 2006/0212904 A1 | 9/2006 | Klarfeld et al. |
| 2006/0222322 A1 | 10/2006 | Levitan |
| 2006/0224260 A1 | 10/2006 | Hicken et al. |
| 2006/0253330 A1 | 11/2006 | Maggio et al. |
| 2006/0274828 A1 | 12/2006 | Siemens et al. |
| 2007/0003149 A1 | 1/2007 | Nagumo et al. |
| 2007/0018980 A1 | 1/2007 | Berteig et al. |
| 2007/0024706 A1 | 2/2007 | Brannon et al. |
| 2007/0028272 A1 | 2/2007 | Lockton |
| 2007/0033633 A1 | 2/2007 | Andrews et al. |
| 2007/0055989 A1 | 3/2007 | Shanks et al. |
| 2007/0079325 A1 | 4/2007 | de Heer |
| 2007/0085759 A1 | 4/2007 | Lee et al. |
| 2007/0099684 A1 | 5/2007 | Butterworth |
| 2007/0101369 A1 | 5/2007 | Dolph |
| 2007/0118801 A1 | 5/2007 | Harshbarger et al. |
| 2007/0154169 A1 | 7/2007 | Cordray et al. |
| 2007/0157234 A1 | 7/2007 | Walker |
| 2007/0157260 A1 | 7/2007 | Walker |
| 2007/0157261 A1 | 7/2007 | Steelberg et al. |
| 2007/0162395 A1 | 7/2007 | Ben-Yaacov et al. |
| 2007/0180488 A1 | 8/2007 | Walter et al. |
| 2007/0220583 A1 | 9/2007 | Bailey et al. |
| 2007/0226761 A1 | 9/2007 | Zalewski et al. |
| 2007/0239754 A1 | 10/2007 | Schnitman |
| 2007/0253677 A1 | 11/2007 | Wang |
| 2007/0253688 A1 | 11/2007 | Koennecke |
| 2007/0263722 A1 | 11/2007 | Fukuzawa |
| 2008/0001956 A1 | 1/2008 | Markovic et al. |
| 2008/0019445 A1 | 1/2008 | Aono et al. |
| 2008/0021187 A1 | 1/2008 | Wescott et al. |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0086456 A1 | 4/2008 | Rasanen et al. |
| 2008/0086754 A1 | 4/2008 | Chen et al. |
| 2008/0091721 A1 | 4/2008 | Harboe et al. |
| 2008/0092159 A1 | 4/2008 | Dmitriev et al. |
| 2008/0139301 A1 | 6/2008 | Holthe |
| 2008/0148152 A1 | 6/2008 | Blinnikka et al. |
| 2008/0161111 A1 | 7/2008 | Schuman |
| 2008/0170687 A1 | 7/2008 | Moors et al. |
| 2008/0177893 A1 | 7/2008 | Bowra et al. |
| 2008/0178232 A1 | 7/2008 | Velusamy |
| 2008/0238938 A1 | 10/2008 | Eklund et al. |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0022165 A1 | 1/2009 | Candelore et al. |
| 2009/0024923 A1 | 1/2009 | Hartwig et al. |
| 2009/0027337 A1 | 1/2009 | Hildreth |
| 2009/0029771 A1 | 1/2009 | Donahue |
| 2009/0055880 A1 | 2/2009 | Batteram et al. |
| 2009/0063681 A1 | 3/2009 | Ramakrishnan et al. |
| 2009/0063995 A1 | 3/2009 | Baron et al. |
| 2009/0077137 A1 | 3/2009 | Weda et al. |
| 2009/0079663 A1 | 3/2009 | Chang et al. |
| 2009/0083631 A1 | 3/2009 | Sidi et al. |
| 2009/0116817 A1 | 5/2009 | Kim et al. |
| 2009/0131764 A1 | 5/2009 | Lee et al. |
| 2009/0133051 A1 | 5/2009 | Hildreth |
| 2009/0133071 A1 | 5/2009 | Sakai et al. |
| 2009/0138805 A1 | 5/2009 | Hildreth |
| 2009/0177538 A1 | 7/2009 | Brewer et al. |
| 2009/0178089 A1 | 7/2009 | Picco et al. |
| 2009/0191971 A1 | 7/2009 | Avent |
| 2009/0195652 A1 | 8/2009 | Gal |
| 2009/0199697 A1 | 8/2009 | Lehtiniemi et al. |
| 2009/0210790 A1 | 8/2009 | Thomas |
| 2009/0226046 A1 | 9/2009 | Shteyn |
| 2009/0228572 A1 | 9/2009 | Wall et al. |
| 2009/0254827 A1 | 10/2009 | Gonze et al. |
| 2009/0258708 A1 | 10/2009 | Figueroa |
| 2009/0265737 A1 | 10/2009 | Issa et al. |
| 2009/0265746 A1 | 10/2009 | Halen et al. |
| 2009/0297118 A1 | 12/2009 | Fink et al. |
| 2009/0320075 A1 | 12/2009 | Marko |
| 2010/0017820 A1 | 1/2010 | Thevathasan et al. |
| 2010/0031149 A1* | 2/2010 | Gentile .............. H04N 5/91 348/135 |
| 2010/0042496 A1 | 2/2010 | Wang et al. |
| 2010/0050083 A1 | 2/2010 | Axen et al. |
| 2010/0069159 A1 | 3/2010 | Yamada et al. |
| 2010/0070987 A1 | 3/2010 | Amento et al. |
| 2010/0077290 A1 | 3/2010 | Pueyo |
| 2010/0088726 A1 | 4/2010 | Curtis et al. |
| 2010/0122286 A1 | 5/2010 | Begeja et al. |
| 2010/0146145 A1 | 6/2010 | Tippin et al. |
| 2010/0153512 A1 | 6/2010 | Balassanian et al. |
| 2010/0153885 A1 | 6/2010 | Yates |
| 2010/0161792 A1 | 6/2010 | Palm et al. |
| 2010/0162344 A1 | 6/2010 | Casagrande et al. |
| 2010/0167816 A1 | 7/2010 | Perlman et al. |
| 2010/0167819 A1 | 7/2010 | Schell |
| 2010/0186032 A1 | 7/2010 | Pradeep et al. |
| 2010/0186579 A1 | 7/2010 | Schnitman |
| 2010/0199299 A1 | 8/2010 | Chang et al. |
| 2010/0210351 A1 | 8/2010 | Berman |
| 2010/0251295 A1 | 9/2010 | Amento et al. |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |

(56) References Cited

U.S. PATENT DOCUMENTS

| | | |
|---|---|---|
| 2010/0287033 A1 | 11/2010 | Mathur |
| 2010/0287475 A1 | 11/2010 | van Zwol et al. |
| 2010/0293073 A1 | 11/2010 | Schmidt |
| 2010/0293455 A1 | 11/2010 | Bloch |
| 2010/0312670 A1 | 12/2010 | Dempsey |
| 2010/0325135 A1 | 12/2010 | Chen et al. |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0060993 A1 | 3/2011 | Cotter et al. |
| 2011/0069940 A1 | 3/2011 | Shimy et al. |
| 2011/0078023 A1 | 3/2011 | Aldrey et al. |
| 2011/0078740 A1 | 3/2011 | Bolyukh et al. |
| 2011/0096225 A1 | 4/2011 | Candelore |
| 2011/0125512 A1 | 5/2011 | Huang |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0169603 A1 | 7/2011 | Fithian et al. |
| 2011/0182366 A1 | 7/2011 | Frojdh et al. |
| 2011/0191684 A1 | 8/2011 | Greenberg |
| 2011/0191801 A1 | 8/2011 | Vytheeswaran |
| 2011/0193982 A1 | 8/2011 | Kook et al. |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0238494 A1 | 9/2011 | Park |
| 2011/0239246 A1 | 9/2011 | Woodward et al. |
| 2011/0246661 A1 | 10/2011 | Manzari et al. |
| 2011/0246885 A1 | 10/2011 | Pantos et al. |
| 2011/0252031 A1 | 10/2011 | Blumenthal et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |
| 2011/0293240 A1 | 12/2011 | Newton et al. |
| 2011/0307786 A1 | 12/2011 | Shuster |
| 2011/0307919 A1 | 12/2011 | Weerasinghe |
| 2011/0307920 A1 | 12/2011 | Blanchard et al. |
| 2011/0313859 A1 | 12/2011 | Stillwell et al. |
| 2011/0314030 A1 | 12/2011 | Burba et al. |
| 2012/0004960 A1 | 1/2012 | Ma et al. |
| 2012/0005287 A1 | 1/2012 | Gadel et al. |
| 2012/0011438 A1 | 1/2012 | Kim et al. |
| 2012/0017141 A1 | 1/2012 | Eelen et al. |
| 2012/0062576 A1 | 3/2012 | Rosenthal et al. |
| 2012/0072420 A1 | 3/2012 | Moganti et al. |
| 2012/0081389 A1 | 4/2012 | Dilts |
| 2012/0089911 A1 | 4/2012 | Hosking et al. |
| 2012/0090000 A1 | 4/2012 | Cohen et al. |
| 2012/0094768 A1 | 4/2012 | McCaddon et al. |
| 2012/0105723 A1 | 5/2012 | Van Coppenolle et al. |
| 2012/0110618 A1 | 5/2012 | Kilar et al. |
| 2012/0110620 A1 | 5/2012 | Kilar et al. |
| 2012/0117145 A1 | 5/2012 | Clift et al. |
| 2012/0120114 A1 | 5/2012 | You et al. |
| 2012/0134646 A1 | 5/2012 | Alexander |
| 2012/0137015 A1 | 5/2012 | Sun |
| 2012/0147954 A1 | 6/2012 | Kasai et al. |
| 2012/0159530 A1 | 6/2012 | Ahrens et al. |
| 2012/0159541 A1 | 6/2012 | Carton et al. |
| 2012/0179970 A1 | 7/2012 | Hayes |
| 2012/0198412 A1 | 8/2012 | Creighton et al. |
| 2012/0198489 A1 | 8/2012 | O'Connell et al. |
| 2012/0213495 A1 | 8/2012 | Hafeneger et al. |
| 2012/0225693 A1 | 9/2012 | Sirpal et al. |
| 2012/0233631 A1 | 9/2012 | Geshwind |
| 2012/0246032 A1 | 9/2012 | Beroukhim et al. |
| 2012/0263263 A1 | 10/2012 | Olsen et al. |
| 2012/0308206 A1 | 12/2012 | Kulas |
| 2012/0317198 A1 | 12/2012 | Patton et al. |
| 2012/0324491 A1 | 12/2012 | Bathiche et al. |
| 2013/0021269 A1 | 1/2013 | Johnson et al. |
| 2013/0024888 A1 | 1/2013 | Sivertsen |
| 2013/0028446 A1 | 1/2013 | Krzyzanowski |
| 2013/0028573 A1 | 1/2013 | Hoofien et al. |
| 2013/0031582 A1 | 1/2013 | Tinsman et al. |
| 2013/0033542 A1 | 2/2013 | Nakazawa |
| 2013/0036200 A1 | 2/2013 | Roberts et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0094830 A1 | 4/2013 | Stone et al. |
| 2013/0097410 A1 | 4/2013 | Bourges-Sevenier |
| 2013/0097643 A1 | 4/2013 | Stone et al. |
| 2013/0117248 A1 | 5/2013 | Bhogal et al. |
| 2013/0125181 A1 | 5/2013 | Montemayor et al. |
| 2013/0129304 A1 | 5/2013 | Feinson |
| 2013/0129308 A1 | 5/2013 | Karn et al. |
| 2013/0167168 A1 | 6/2013 | Ellis et al. |
| 2013/0173765 A1 | 7/2013 | Korbecki |
| 2013/0177294 A1 | 7/2013 | Kennberg |
| 2013/0188923 A1 | 7/2013 | Hartley et al. |
| 2013/0195427 A1 | 8/2013 | Sathish |
| 2013/0202265 A1 | 8/2013 | Arrasvuori et al. |
| 2013/0204710 A1 | 8/2013 | Boland et al. |
| 2013/0205314 A1 | 8/2013 | Ramaswamy et al. |
| 2013/0219425 A1 | 8/2013 | Swartz |
| 2013/0235152 A1 | 9/2013 | Hannuksela et al. |
| 2013/0235270 A1 | 9/2013 | Sasaki et al. |
| 2013/0254292 A1 | 9/2013 | Bradley |
| 2013/0259442 A1 | 10/2013 | Bloch et al. |
| 2013/0268620 A1 | 10/2013 | Osminer |
| 2013/0271453 A1 | 10/2013 | Ruotsalainen et al. |
| 2013/0282917 A1 | 10/2013 | Reznik et al. |
| 2013/0283401 A1 | 10/2013 | Pabla et al. |
| 2013/0290818 A1 | 10/2013 | Arrasvuori et al. |
| 2013/0298146 A1 | 11/2013 | Conrad et al. |
| 2013/0308926 A1 | 11/2013 | Jang et al. |
| 2013/0328888 A1 | 12/2013 | Beaver et al. |
| 2013/0330055 A1 | 12/2013 | Zimmermann et al. |
| 2013/0335427 A1 | 12/2013 | Cheung et al. |
| 2014/0015940 A1 | 1/2014 | Yoshida |
| 2014/0019865 A1 | 1/2014 | Shah |
| 2014/0025620 A1 | 1/2014 | Greenzeiger et al. |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0046946 A2 | 2/2014 | Friedmann et al. |
| 2014/0078397 A1 | 3/2014 | Bloch et al. |
| 2014/0082666 A1 | 3/2014 | Bloch et al. |
| 2014/0085196 A1 | 3/2014 | Zucker et al. |
| 2014/0086445 A1 | 3/2014 | Brubeck et al. |
| 2014/0094313 A1 | 4/2014 | Watson et al. |
| 2014/0101550 A1 | 4/2014 | Zises |
| 2014/0105420 A1 | 4/2014 | Lee |
| 2014/0126877 A1 | 5/2014 | Crawford et al. |
| 2014/0129618 A1 | 5/2014 | Panje et al. |
| 2014/0136186 A1 | 5/2014 | Adami et al. |
| 2014/0143298 A1 | 5/2014 | Klotzer et al. |
| 2014/0152564 A1 | 6/2014 | Gulezian et al. |
| 2014/0156677 A1 | 6/2014 | Collins, III et al. |
| 2014/0178051 A1 | 6/2014 | Bloch et al. |
| 2014/0186008 A1 | 7/2014 | Eyer |
| 2014/0194211 A1 | 7/2014 | Chimes et al. |
| 2014/0210860 A1 | 7/2014 | Caissy |
| 2014/0219630 A1 | 8/2014 | Minder |
| 2014/0220535 A1 | 8/2014 | Angelone |
| 2014/0237520 A1 | 8/2014 | Rothschild et al. |
| 2014/0245152 A1 | 8/2014 | Carter et al. |
| 2014/0270680 A1 | 9/2014 | Bloch et al. |
| 2014/0279032 A1 | 9/2014 | Roever et al. |
| 2014/0282013 A1 | 9/2014 | Amijee |
| 2014/0282642 A1 | 9/2014 | Needham et al. |
| 2014/0298173 A1 | 10/2014 | Rock |
| 2014/0314239 A1 | 10/2014 | Meyer et al. |
| 2014/0317638 A1 | 10/2014 | Hayes |

(56) References Cited

U.S. PATENT DOCUMENTS

| | | |
|---|---|---|
| 2014/0380167 A1 | 12/2014 | Bloch et al. |
| 2015/0007234 A1 | 1/2015 | Rasanen et al. |
| 2015/0012369 A1 | 1/2015 | Dharmaji et al. |
| 2015/0015789 A1 | 1/2015 | Guntur et al. |
| 2015/0020086 A1 | 1/2015 | Chen et al. |
| 2015/0033266 A1 | 1/2015 | Klappert et al. |
| 2015/0046946 A1 | 2/2015 | Hassell et al. |
| 2015/0058342 A1 | 2/2015 | Kim et al. |
| 2015/0063781 A1 | 3/2015 | Silverman et al. |
| 2015/0067596 A1 | 3/2015 | Brown et al. |
| 2015/0067723 A1 | 3/2015 | Bloch et al. |
| 2015/0070458 A1 | 3/2015 | Kim et al. |
| 2015/0070516 A1 | 3/2015 | Shoemake et al. |
| 2015/0074721 A1 | 3/2015 | Fishman et al. |
| 2015/0104144 A1 | 4/2015 | Minemura |
| 2015/0104155 A1 | 4/2015 | Bloch et al. |
| 2015/0106845 A1 | 4/2015 | Popkiewicz et al. |
| 2015/0124171 A1 | 5/2015 | King |
| 2015/0154439 A1 | 6/2015 | Anzue et al. |
| 2015/0160853 A1 | 6/2015 | Hwang et al. |
| 2015/0179224 A1 | 6/2015 | Bloch et al. |
| 2015/0181271 A1 | 6/2015 | Onno et al. |
| 2015/0181291 A1 | 6/2015 | Wheatley |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |
| 2015/0228307 A1 | 8/2015 | Cabanero |
| 2015/0256861 A1 | 9/2015 | Oyman |
| 2015/0258454 A1 | 9/2015 | King et al. |
| 2015/0278986 A1 | 10/2015 | Edwin et al. |
| 2015/0286716 A1 | 10/2015 | Snibbe et al. |
| 2015/0293675 A1 | 10/2015 | Bloch et al. |
| 2015/0294685 A1 | 10/2015 | Bloch et al. |
| 2015/0304698 A1 | 10/2015 | Redol |
| 2015/0310660 A1 | 10/2015 | Mogilefsky et al. |
| 2015/0318018 A1 | 11/2015 | Kaiser et al. |
| 2015/0331485 A1 | 11/2015 | Wilairat et al. |
| 2015/0331933 A1 | 11/2015 | Tocchini, IV et al. |
| 2015/0331942 A1 | 11/2015 | Tan |
| 2015/0348325 A1 | 12/2015 | Voss |
| 2015/0373385 A1 | 12/2015 | Straub |
| 2016/0009487 A1 | 1/2016 | Edwards et al. |
| 2016/0021412 A1 | 1/2016 | Zito, Jr. |
| 2016/0029002 A1 | 1/2016 | Balko |
| 2016/0037217 A1 | 2/2016 | Harmon et al. |
| 2016/0057497 A1 | 2/2016 | Kim et al. |
| 2016/0062540 A1 | 3/2016 | Yang et al. |
| 2016/0065831 A1 | 3/2016 | Howard et al. |
| 2016/0066051 A1 | 3/2016 | Caidar et al. |
| 2016/0086585 A1 | 3/2016 | Sugimoto |
| 2016/0094875 A1 | 3/2016 | Peterson et al. |
| 2016/0099024 A1 | 4/2016 | Gilley |
| 2016/0100226 A1 | 4/2016 | Sadler et al. |
| 2016/0104513 A1 | 4/2016 | Bloch et al. |
| 2016/0105724 A1 | 4/2016 | Bloch et al. |
| 2016/0132203 A1 | 5/2016 | Seto et al. |
| 2016/0134946 A1 | 5/2016 | Glover et al. |
| 2016/0142889 A1 | 5/2016 | O'Connor et al. |
| 2016/0150278 A1 | 5/2016 | Greene |
| 2016/0162179 A1 | 6/2016 | Annett et al. |
| 2016/0170948 A1 | 6/2016 | Bloch |
| 2016/0173944 A1 | 6/2016 | Kilar et al. |
| 2016/0192009 A1 | 6/2016 | Sugio et al. |
| 2016/0217829 A1 | 7/2016 | Bloch et al. |
| 2016/0224573 A1 | 8/2016 | Shahraray et al. |
| 2016/0232579 A1 | 8/2016 | Fahnestock |
| 2016/0277779 A1 | 9/2016 | Zhang et al. |
| 2016/0303608 A1 | 10/2016 | Jossick |
| 2016/0321689 A1 | 11/2016 | Turgeman |
| 2016/0322054 A1 | 11/2016 | Bloch et al. |
| 2016/0323608 A1 | 11/2016 | Bloch et al. |
| 2016/0337691 A1 | 11/2016 | Prasad et al. |
| 2016/0344873 A1 | 11/2016 | Jenzeh et al. |
| 2016/0365117 A1 | 12/2016 | Boliek et al. |
| 2016/0366454 A1 | 12/2016 | Tatourian et al. |
| 2017/0006322 A1 | 1/2017 | Dury et al. |
| 2017/0032562 A1* | 2/2017 | Block .............. H04N 21/4316 |
| 2017/0041372 A1 | 2/2017 | Hosur |
| 2017/0062012 A1 | 3/2017 | Bloch et al. |
| 2017/0142486 A1 | 5/2017 | Masuda |
| 2017/0149795 A1 | 5/2017 | Day, II |
| 2017/0178409 A1 | 6/2017 | Bloch et al. |
| 2017/0178601 A1 | 6/2017 | Bloch et al. |
| 2017/0195736 A1 | 7/2017 | Chai et al. |
| 2017/0264920 A1 | 9/2017 | Mickelsen |
| 2017/0286424 A1 | 10/2017 | Peterson |
| 2017/0289220 A1 | 10/2017 | Bloch et al. |
| 2017/0295410 A1 | 10/2017 | Bloch et al. |
| 2017/0326462 A1 | 11/2017 | Lyons et al. |
| 2017/0337196 A1 | 11/2017 | Goela et al. |
| 2017/0345460 A1 | 11/2017 | Bloch et al. |
| 2018/0007443 A1 | 1/2018 | Cannistraro et al. |
| 2018/0014049 A1 | 1/2018 | Griffin et al. |
| 2018/0025078 A1 | 1/2018 | Quennesson |
| 2018/0048831 A1 | 2/2018 | Berwick et al. |
| 2018/0060430 A1 | 3/2018 | Lu |
| 2018/0068019 A1 | 3/2018 | Novikoff et al. |
| 2018/0095645 A1 | 4/2018 | Subudhi et al. |
| 2018/0115592 A1 | 4/2018 | Samineni |
| 2018/0130501 A1 | 5/2018 | Bloch et al. |
| 2018/0176573 A1 | 6/2018 | Chawla et al. |
| 2018/0191574 A1 | 7/2018 | Vishnia et al. |
| 2018/0254067 A1 | 9/2018 | Elder |
| 2018/0262798 A1 | 9/2018 | Ramachandra |
| 2018/0300852 A1 | 10/2018 | Chen et al. |
| 2018/0300858 A1 | 10/2018 | Chen et al. |
| 2018/0310049 A1 | 10/2018 | Takahashi et al. |
| 2018/0314959 A1 | 11/2018 | Apokatanidis et al. |
| 2018/0376205 A1 | 12/2018 | Oswal et al. |
| 2019/0005716 A1 | 1/2019 | Singh et al. |
| 2019/0066188 A1 | 2/2019 | Rothschild |
| 2019/0069038 A1 | 2/2019 | Phillips |
| 2019/0069039 A1 | 2/2019 | Phillips |
| 2019/0075367 A1 | 3/2019 | van Zessen et al. |
| 2019/0090002 A1 | 3/2019 | Ramadorai et al. |
| 2019/0098371 A1 | 3/2019 | Keesan |
| 2019/0104342 A1 | 4/2019 | Catalano et al. |
| 2019/0132639 A1 | 5/2019 | Panchaksharaiah et al. |
| 2019/0139314 A1 | 5/2019 | Marsh et al. |
| 2019/0166412 A1 | 5/2019 | Panchaksharaiah et al. |
| 2019/0182525 A1 | 6/2019 | Steinberg et al. |
| 2019/0238719 A1 | 8/2019 | Alameh et al. |
| 2019/0313080 A1* | 10/2019 | Mitchell .............. H04N 19/103 |
| 2019/0335225 A1 | 10/2019 | Fang et al. |
| 2019/0354936 A1 | 11/2019 | Deluca et al. |
| 2020/0023157 A1 | 1/2020 | Lewis et al. |
| 2020/0029128 A1* | 1/2020 | Erskine .............. H04N 21/4784 |
| 2020/0037047 A1 | 1/2020 | Cheung et al. |
| 2020/0059699 A1* | 2/2020 | Malev ...................... G06T 3/40 |
| 2020/0108316 A1* | 4/2020 | Nay .................. H04N 21/23424 |
| 2020/0169787 A1 | 5/2020 | Pearce et al. |
| 2020/0193163 A1 | 6/2020 | Chang et al. |
| 2020/0344508 A1 | 10/2020 | Edwards et al. |
| 2021/0099756 A1* | 4/2021 | Gnanapragasam .... G06V 20/41 |
| 2021/0263564 A1* | 8/2021 | Chen .................. H04N 21/4318 |
| 2022/0046291 A1* | 2/2022 | Jiang .................. H04N 21/8126 |
| 2022/0245209 A1 | 8/2022 | Cho et al. |

FOREIGN PATENT DOCUMENTS

| | | |
|---|---|---|
| DE | 2359916 A1 | 6/1975 |
| DE | 004038801 A1 | 6/1992 |
| DE | 10053720 A1 | 4/2002 |
| EP | 0965371 A2 | 12/1999 |
| EP | 1033157 A2 | 9/2000 |
| EP | 2104105 A1 | 9/2009 |
| GB | 2359916 A | 9/2001 |
| GB | 2428329 A | 1/2007 |
| JP | 2003-245471 A | 9/2003 |
| JP | 2008-005288 A | 1/2008 |
| KR | 2004-0005068 A | 1/2004 |
| KR | 2010-0037413 A | 4/2010 |

(56) References Cited

FOREIGN PATENT DOCUMENTS

| WO | WO-1996/013810 A1 | 5/1996 |
|----|-------------------|--------|
| WO | WO-2000/059224 A1 | 10/2000 |
| WO | WO-2007/062223 A2 | 5/2007 |
| WO | WO-2007/138546 A2 | 12/2007 |
| WO | WO-2008/001350 A2 | 1/2008 |
| WO | WO-2008/052009 A2 | 5/2008 |
| WO | WO-2008/057444 A2 | 5/2008 |
| WO | WO-2009/125404 A2 | 10/2009 |
| WO | WO-2009/137919 A1 | 11/2009 |

OTHER PUBLICATIONS

Archos Gen 5 English User Manual Version 3.0, Jul. 26, 2007, pp. 1-81.
Barlett M, (2008), "iTunes 11: How to Queue Next Song," *Technipages*, Oct. 6, 2008 issue, pp. 1-8, retrieved on Dec. 26, 2013 from the internet: http://www.technipages.com/itunes-queue-next-song.html.
Google Scholar search, "Inserting metadata inertion advertising video", Jul. 16, 2021, 2 pages.
International Preliminary Report and Written Opinion of PCT/IL2012/000080 dated Aug. 27, 2013, 7 pages.
International Search Report and Written Opinion for International Patent Application PCT/IB2013/001000 mailed Jul. 31, 2013 (12 pages).
International Search Report for International Patent Application PCT/IL2010/000362 dated Aug. 25, 2010 (2 pages).
International Search Report for International Patent Application PCT/IL2012/000081 dated Jun. 28, 2012 (4 pages).
International Search Report of PCT/IL2012/000080 dated Aug. 9, 2012, 4 pages.
Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, (pp. 1-8).
Marciel, M. et al., "Understanding the Detection of View Fraud in Video Content Portals", (Feb. 5, 2016), Cornell University, pp. 1-13.
Miller, Gregor et al., "MiniDiver: A Novel Mobile Media Playback Interface for Rich Video Content on an iPhoneTM", Entertainment Computing A ICEC 2009, Sep. 3, 2009, pp. 98-109.
Sodagar, I., "The MPEG-DASH Standard for Multimedia Streaming Over the Internet", IEEE Multimedia, IEEE Service Center, New York, NY US, (2011) 18(4): 62-67.
Supplemental European Search Report for EP10774637.2 (PCT/IL2010/000362) mailed Jun. 28, 2012 (6 pages).
Supplemental European Search Report for EP13184145, (Jan. 30, 2014), 3 pages.
Yang, H, et al., "Time Stamp Synchronization in Video Systems," Teletronics Technology Corporation, <http://www.ttcdas.com/products/daus_encoders/pdf/_tech_papers/tp_2010_time_stamp_video_system.pdf>, Abstract, (8 pages).
U.S. Appl. No. 14/884,285 U.S. Pat. No. 11,314,936 Published as US20170178601, Systems and Method for Assembling a Recorded Composition, filed Oct. 15, 2015.
U.S. Appl. No. 13/033,916 U.S. Pat. No. 9,607,655 Published as US2011/0200116, System and Method for Seamless Multimedia Assembly, filed Feb. 24, 2011.
U.S. Appl. No. 13/034,645 U.S. Pat. No. 11,232,458 Published as US2011/0202562, System and Method for Data Mining Within Interactive Multimedia, filed Feb. 24, 2011.
U.S. Appl. No. 17/551,847 Published as US2021/0366520, Systems and Methods for Data Mining Within Interactive Multimedia, filed Dec. 15, 2021.
U.S. Appl. No. 13/437,164 U.S. Pat. No. 8,600,220 Published as US2013/0259442, Systems and Methods for Loading More Than One Video Content at a Time, filed Apr. 2, 2012.
U.S. Appl. No. 15/481,916 U.S. Pat. No. 10,755,747 Published as US2017-0345460, Systems and Methods for Creating Linear Video From Branched Video, filed Apr. 7, 2017.
U.S. Appl. No. 14/534,626 U.S. Pat. No. 10,692,540 Published as US-2018-0130501-A1, Systems and Methods for Dynamic Video Bookmarking, filed Sep. 13, 2017.
U.S. Appl. No. 16/865,896 U.S. Pat. No. 10,885,944 Published as US2020/0265870, Systems and Methods for Dynamic Video Bookmarking, filed May 4, 2020.
U.S. Appl. No. 17/138,434 U.S. Pat. No. 11,348,618 Published as US2021/0366520, Systems and Methods for Dynamic Video Bookmarking, filed Dec. 30, 2020.
U.S. Appl. No. 17/701,168 Published as US2022/0215861, Systems and Methods for Dynamic Video Bookmarking, filed Mar. 22, 2022.
U.S. Appl. No. 14/534,626 Published as US2016/0105724, Systems and Methods for Parallel Track Transitions, filed Mar. 31, 2022.
U.S. Appl. No. 16/559,082 Published as US 2019/0392868, Systems and Methods for Adaptive and Responsive Video, filed Sep. 3, 2019.
U.S. Appl. No. 14/978,464 U.S. Pat. No. 11,164,548 Published as US2017/0178601, Intelligent Buffering of Large-Scale Video, filed Dec. 22, 2015.
U.S. Appl. No. 17/403,703 Published as US2022/0038673, Seamless Transitions In Large-Scale Video, filed Aug. 16, 2021.
U.S. Appl. No. 15/395,477 U.S. Pat. No. 11,050,809 Published as US2018/0191574, Systems and Methods for Dynamic Weighting of Branced Video Paths, filed Dec. 30, 2016.
U.S. Appl. No. 17/328,261 Published as US2021/0281626, Systems and Methods for Dynamic Weighting of Branched Video Paths, filed May 24, 2021.
U.S. Appl. No. 15/997,284 Published as US2019/0373330, Interactive Video Dynamic Adaption and User Profiling, Jun. 4, 2018.
U.S. Appl. No. 17/091,149 Published as US2021/0306707, Dynamic Library Display for Interactive Videos, filed Nov. 6, 2020.
U.S. Appl. No. 16/591,103 Published as US2021/0105433, Systems And Methods For Dynamically Adjusting Video Aspect Ratios, filed Oct. 2, 2019.
U.S. Appl. No. 16/793,205 Published as US2021/0258647, Dynamic adaption of interactive video players using behavioral analytics, filed Feb. 18, 2020.
U.S. Appl. No. 16/793,201 U.S. Pat. No. 11,245,961 Published as US2021/0258640, Systems And Methods For Detecting Anomalous Activities for Interactive Videos, filed Feb. 18, 2020.
U.S. Appl. No. 16/922,540 Published as US2022/0014817, Systems And Methods For Seamless Audio and Video Endpoint Transitions, filed Jul. 7, 2020.
U.S. Appl. No. 16/793,201, Shader-based dynamic video manipulation, filed Aug. 31, 2021.
U.S. Appl. No. 17/484,604, Discovery engine for interactive videos, filed Sep. 24, 2021.
U.S. Appl. No. 17/484,635, Video Player Integration within Websites, filed Sep. 24, 2021.
Bodaghi, A. et al., "Personalization of Interactive Recommender Systems for Expert Users", 4th International Conference on the Web Research (ICWR), (2018), pp. 58-62.
U.S. Appl. No. 12/706,721 U.S. Pat. No. 9,190,110 Published as US2010/0293455, System and Method for Assembling a Recorded Composition, filed Feb. 17, 2010.
U.S. Appl. No. 14/884,285 Published as US2017/0178601, Systems and Method for Assmebling a Recorded Compostion, filed Oct. 15, 2015.
U.S. Appl. No. 13/033,916 U.S. Pat. No. 9,607,955 Published as US2011/0200116, System and Method For Seamless Multimedia Assembly, filed Feb. 24, 2011.
U.S. Appl. No. 13/034,645 Published as US2011/0202562, System and Method for Data Mining Within Interactive Multimedia, filed Feb. 24, 2011.
U.S. Appl. No. 13/437,164 U.S. Pat. No. 8,600,220 Published as US2013/0259442, Systems and Methods for Loading More Than One Video Content at a Time, Apr. 2, 2012.
U.S. Appl. No. 14/069,694 U.S. Pat. No. 9,271,015 Published as US2014/0178051, Systems and Methods for Loading More Than One Video Content at a Time, filed Nov. 1, 2013.
U.S. Appl. No. 13/622,780 U.S. Pat. No. 8,860,882 Published as US2014/0078397, Systems and Methods for Constructing Multimedia Content Modules, filed Sep. 19, 2012.

(56) References Cited

OTHER PUBLICATIONS

U.S. Appl. No. 13/622,795 U.S. Pat. No. 9,009,619 Published as US2014/0082666, Progress Bar for Branched Videos, filed Sep. 19, 2012.
U.S. Appl. No. 14/639,579 U.S. Pat. No. 10,474,334 Published as US2015/0199116, Progress Bar for Branched Videos, filed Mar. 5, 2015.
U.S. Appl. No. 13/838,830 U.S. Pat. No. 9,257,148 Published as US2014/0270680, System and Method for Synchronization of Selectably Presentable Media Streams, filed Mar. 15, 2013.
U.S. Appl. No. 14/984,821 U.S. Pat. No. 10,418,066 Published as US2016/0217829, System and Method for Synchronization of Selectably Presentable Media Streams, filed Dec. 30, 2015.
U.S. Appl. No. 13/921,536 U.S. Pat. No. 9,832,516 Published as US2014/0380167, Systems and Methods for Multiple Device Interaction with Selectably Presentable Media Streams, filed Jun. 19, 2013.
U.S. Appl. No. 14/107,600 U.S. Pat. No. 10,448,119 Published as US2015/0067723, Methods and Systems for Unfolding Video Pre-Roll, filed Dec. 16, 2013.
U.S. Appl. No. 14/335,381 U.S. Pat. No. 9,530,454 Published as US2015/0104155, Systems and Methods for Real-Time Pixel Switching, filed Jul. 18, 2014.
U.S. Appl. No. 14/139,996 U.S. Pat. No. 9,641,898 Published as US2015/0181301, Methods and Systems for In-Video Library, filed Dec. 24, 2013.
U.S. Appl. No. 14/140,007 U.S. Pat. No. 9,520,155 Published as US2015/0179224, Methods and Systems For Seeking To Non-Key Frames, filed Dec. 24, 2013.
U.S. Appl. No. 14/249,627 U.S. Pat. No. 9,653,115 Published as US 2015-0294685, Systems and Methods for Creating Linear Video From Branched Video, filed Apr. 10, 2014.
U.S. Appl. No. 15/481,916 Published as US 2017-0345460, Systems and Methods for Creating Linear Video From Branched Video, filed Apr. 7, 2017.
U.S. Appl. No. 16/986,977 Published as US 2020/0365187, Systems and Methods for Creating Linear Video From Branched Video, filed Aug. 6, 2020.
U.S. Appl. No. 14/249,665 U.S. Pat. No. 9,792,026 Published as US2015/0293675, Dynamic Timeline For Branched Video, filed Apr. 10, 2014.
U.S. Appl. No. 14/509,700 U.S. Pat. No. 9,792,957 Published as US2016/0104513, Systems and Methods for Dynamic Video Bookmarking, filed Oct. 8, 2014.
U.S. Appl. No. 14/534,626 Published as US-2018-0130501-A1, Systems and Methods for Dynamic Video Bookmarking, filed Sep. 13, 2017.
U.S. Appl. No. 16/865,896, Systems and Methods for Dynamic Video Bookmarking, filed May 4, 2020.
U.S. Appl. No. 17/138,434, Systems and Methods for Dynamic Video Bookmarking, filed Dec. 30, 2020.
U.S. Appl. No. 14/534,626 Published as US2016/0105724, Systems and Methods for Parallel Track Transitions, filed Nov. 6, 2014.
U.S. Appl. No. 14/700,845 U.S. Pat. No. 10,582,265 Published as US2016/0323608, Systems and Methods for Nonlinear Video Playback Using Linear Real-Time Video Players, filed Apr. 30, 2015.
U.S. Appl. No. 16/752,193 Published as US2020/0404382, Systems and Methods for Nonlinear Video Playback Using Linear Real-Time Video Players, filed Jan. 24, 2020.
U.S. Appl. No. 14/700,862 U.S. Pat. No. 9,672,868 Published as US2016/0322054, Systems and Methods for Seamless Media Creation, filed Apr. 30, 2015.
U.S. Appl. No. 14/835,857 U.S. Pat. No. 10,460,765 Published as US2017/0062012, Systems and Methods for Adaptive and Responsive Video, filed Aug. 26, 2015.
U.S. Appl. No. 16/559,082, Systems and Methods for Adaptive and Responsive Video, filed Sep. 3, 2019.
U.S. Appl. No. 16/800,994, Systems and Methods for Adaptive and Responsive Video, filed Feb. 25, 2020.
U.S. Appl. No. 14/978,464 Published as US2017/0178601, Intelligent Buffering of Large-Scale Video, filed Dec. 22, 2015.
U.S. Appl. No. 14/978,491 U.S. Pat. No. 11,128,853 Published as US2017/0178409, Seamless Transitions In Large-Scale Video, filed Dec. 22, 2015.
U.S. Appl. No. 17/403,703, Seamless Transitions In Large-Scale Video, filed Aug. 16, 2021.
U.S. Appl. No. 15/085,209 U.S. Pat. No. 10,462,202 Published as US2017/0289220, Media Stream Rate Synchronization, filed Mar. 30, 2016.
U.S. Appl. No. 15/165,373 Published as US 2017-0295410, Symbiotic Interactive Video, filed May 26, 2016.
U.S. Appl. No. 15/189,931 U.S. Pat. No. 10,218,760 Published as US2017/0374120, Dynamic Summary Generation for Real-time Switchable Videos, filed Jun. 22, 2016.
U.S. Appl. No. 15/395,477 U.S. Pat. No. 11,050,809 Published as US 2018/0191574, Systems And Methods For Dynamic Weighting Of Branched Video Paths, filed Dec. 30, 2016.
U.S. Appl. No. 17/328,261, Systems And Methods For Dynamic Weighting Of Branched Video Paths, filed May 24, 2021.
U.S. Appl. No. 15/997,284 Published as US 2019/0373330, Interactive Video Dynamic Adaptaption and User Profiling, filed Jun. 4, 2018.
U.S. Appl. No. 15/863,191 U.S. Pat. No. 10,257,578, Dynamic Library Display for Interactive Videos, filed Jan. 5, 2018.
U.S. Appl. No. 16/283,066 U.S. Pat. No. 10,856,049 Published as US2019/0349637, Dynamic Library Display for Interactive Videos, filed Feb. 22, 2019.
U.S. Appl. No. 17/091,149, Dynamic Library Display for Interactive Videos, filed Nov. 6, 2020.
U.S. Appl. No. 16/591,103, Systems and Methods for Dynamically Adjusting Video Aspect Ratios, filed Oct. 2, 2019.
U.S. Appl. No. 16/793,205, Dynamic Adaptation of Interactive Video Players Using Behavioral Analytics, filed Feb. 18, 2020.
U.S. Appl. No. 16/793,201, Systems and Methods for Detecting Anomalous Activities for Interactive Videos, filed Feb. 18, 2020.
U.S. Appl. No. 16/922,540, Systems and Methods for Seamless Audio and Video Endpoint Transitions, filed Jul. 7, 2020.
U.S. Appl. No. 17/462,199, Shader-Based Dynamic Video Manipulation, filed Aug. 31, 2021.
U.S. Appl. No. 17/334,027, Automated Platform For Generating Interactive Videos, filed May 28, 2021.

\* cited by examiner

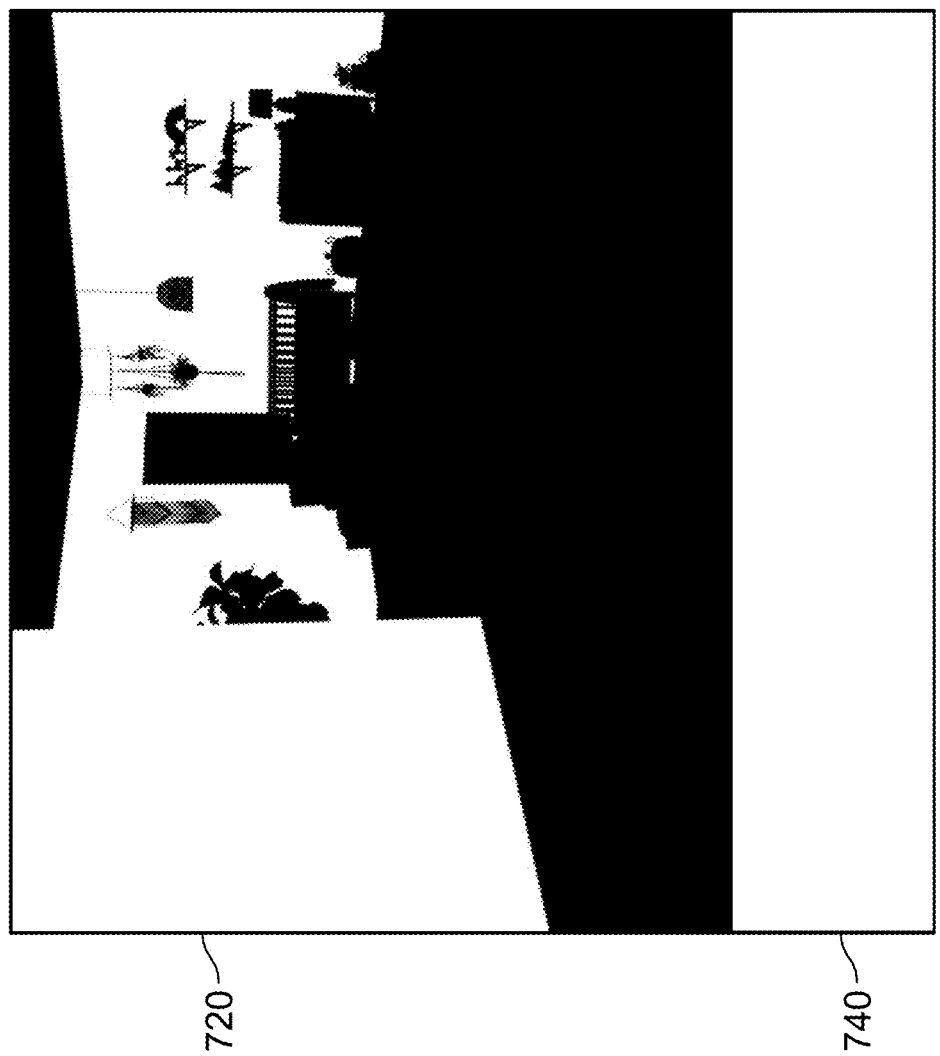

SHADER-BASED DYNAMIC VIDEO MANIPULATION

FIELD OF THE INVENTION

The present disclosure relates generally to digital video and, more particularly, to systems and methods for manipulating video in real-time using shaders.

BACKGROUND

Providing streaming video poses numerous technical challenges, which are multiplied when there is a need to modify or add to the video in real-time as it is being presented to a viewer. In the case of web-based video, elements can be layered on the video using HyperText Markup Language (HTML) or Cascading Style Sheets (CSS); however, this inevitably leads to a degradation in performance. This negative effect on performance is especially true for elements having features that requiring complex rendering, such as opacity, animation, color changes and textures. Weaker or older mobile devices are especially susceptible to degradation in animation frame count, which can lead to a poor user experience and increased battery use. Existing solutions that layer and filter videos together either cannot do so in real-time during presentation of the video or are adapted for special use cases (e.g., providing a virtual background for a live camera stream).

SUMMARY

In one aspect, a computer-implemented method for real-time video manipulation includes the steps of identifying a state of an interactive video; determining properties associated with a user interface (UI) element at the state; receiving a next frame of the interactive video; rendering the UI element into the next frame of the interactive video, wherein the rendering comprises using a shader to perform a graphical operation on the UI element based on the properties; and when the next frame of the interactive video is displayed, layering a transparent interactive element over the UI element rendered into the next frame. Other aspects of the foregoing include corresponding systems and computer programs on non-transitory storage media.

Other implementations of the foregoing aspects can include one or more of the following features. The state of the interactive video can comprise information associated with a user's traversal of a path within the interactive video. The state of the interactive video can comprise information associated with one or more UI elements displayed during presentation of the interactive video. Determining the properties associated with the UI element at the state can comprise determining properties of the UI element that changed from a previous state. The rendering can comprise using a web-based graphics framework to render the next frame over an HTML-based canvas element. The method can further comprise performing each of the identifying, determining, receiving, rendering and layering steps for a plurality of frames of the interactive video. The UI element can comprise a video or animation, and the rendering can comprise using a shader to render each frame of the video or animation into a corresponding frame of the interactive video. The method can further comprise using a shader to render an additional graphical element in the next frame. The UI element can have a first depth level and the additional graphical element can have a second depth level, and the UI element and the additional graphical element can be rendered in the next frame in an order based on their respective depth levels. The method can further comprise, during playback of the interactive video, dynamically modifying the depth level of the UI element and/or the additional graphical element based on changes in the state of the interactive video.

In another aspect, a computer-implemented method for real-time video manipulation comprises the steps of receiving a video comprising a plurality of frames, wherein the frames each comprise a viewable region and a non-viewable region; and for each frame of the plurality of frames, in real time while the video is playing: modifying at least part of the viewable region of the frame based on information in the non-viewable region of the frame, thereby generating a modified version of the frame; and displaying the modified version of the frame within the video Other aspects of the foregoing include corresponding systems and computer programs on non-transitory storage media.

Other implementations of the foregoing aspects can include one or more of the following features. The non-viewable region of the frame can comprise a mask. Modifying the at least part of the viewable region of the frame can comprises using the mask to identify one or more areas in the viewable region of the frame; and performing a graphical operation on the one or more areas. The graphical operation can comprise a shader operation. Performing the graphical operation on the one or more areas can comprise providing, as input to an algorithm, a color associated with a pixel within the one or more areas; receiving, as output from the algorithm, a replacement color; and modifying the pixel to have the replacement color. The mask can be rotated relative to the viewable region of the frame. The mask can be the same in each frame of the plurality of frames. The mask can differ between at least two frames of the plurality of frames. The viewable region of the frame can be larger than the non-viewable region of the frame. The viewable region of the frame can comprise a first viewable region, and the frame can further comprise a second viewable region, and the first viewable region and the second viewable region can be manipulated with respect to each other based on the information in the non-viewable region of the frame.

Further aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

FIGS. 7A-7D depict an example use of a filter framework to change wall color in a video.

DETAILED DESCRIPTION

Described herein are various implementations of methods and supporting systems for using shaders to manipulate and edit a video in real-time, while it is playing. In the case of web-based video (e.g., video embedded on a webpage and viewed through a web browser or native mobile app), relying on HTML-based or CSS-based mechanisms to manipulate video, overlay graphics, or perform other lay-outing or styling operations can use significant central processing unit (CPU) resources. This results in a reduction in parallel operations and, ultimately, poorer video playback performance. The present disclosure overcomes this issue through the use of shader code that can directly communicate with a graphics processing unit (GPU). By using shaders, the video can be manipulated (e.g., user interface (UI) elements can be drawn on the video, colors can be changes, effects can be added) in real-time without the need to use HTML tags and CSS properties. The benefit of the GPU's enhanced ability to perform graphical operations, compared to a CPU, is realized.

Improving the performance of real-time video manipulation is particularly useful in the case of interactive video, where it may be desirable to manipulate portions of a particular video rather than have a separate video for every possible choice. For example, shader code can be used to change the color of car appearing in a single video, which uses less bandwidth and storage than providing a separate video for each possible color choice.

Interactive Media System

Figure 1:
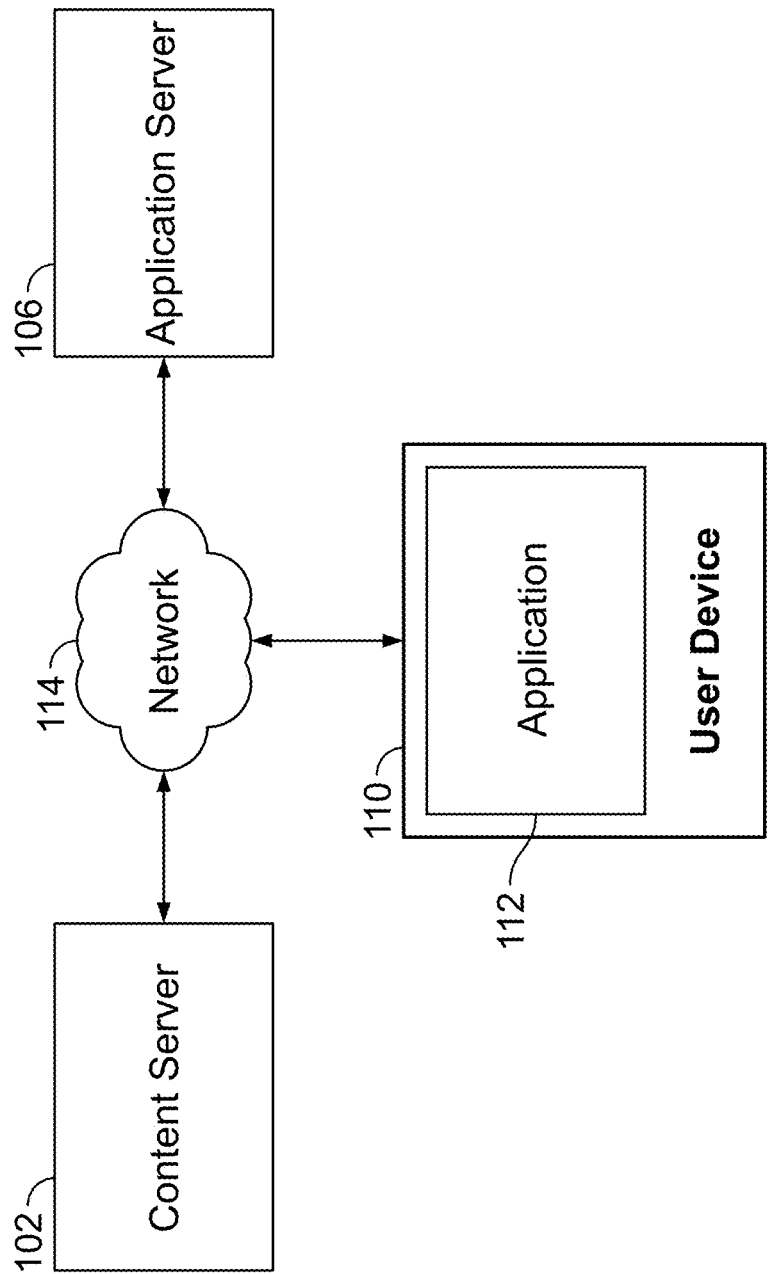
FIG. 1 depicts a high-level architecture of a system for providing interactive video content, according to an implementation.

FIG. 1 depicts an example high-level architecture of such a system for providing interactive video content. Application 112 executes on a user device 110 and receives a media presentation, which can include multiple video and/or audio streams. The media presentation can be presented to a user on user device 110, with application 112 capable of playing and/or editing the content. The user device 110 can be, for example, a smartphone, tablet, laptop, desktop, palmtop, television, gaming device, virtual reality headset, smart glasses, smart watch, music player, mobile telephone, workstation, or other computing device configured to execute the functionality described herein. The user device 110 can have output functionality (e.g., display monitor, touchscreen, image projector, etc.) and input functionality (e.g., touchscreen, keyboard, mouse, physical buttons, motion detection, remote control, etc.).

Media content can be provided to the user device 110 by content server 102, which can be a web server, media server, a node in a content delivery network, or other content source. In some implementations, the application 112 (or a portion thereof) is provided by application server 106. For example, some or all of the described functionality of the application 112 can be implemented in software downloaded to or existing on the user device 110 and, in some instances, some or all of the functionality exists remotely. For example, certain video encoding and processing functions can be performed on one or more remote servers, such as application server 106. In some implementations, the user device 110 serves only to provide output and input functionality, with the remainder of the processes being performed remotely.

The user device 110, content server 102, application server 106, and/or other devices and servers can communicate with each other through communications network 114. The communication can take place via any media such as wireless links (802.11, Bluetooth, GSM, CDMA, etc.), standard telephone lines, LAN or WAN links, broadband connections, and so on. The network 114 can carry TCP/IP protocol communications and HTTP/HTTPS requests made by a web browser, and the connection between clients and servers can be communicated over such TCP/IP networks. The type of network is not a limitation, however, and any suitable network can be used.

More generally, the techniques described herein can be implemented in any suitable hardware or software. If implemented as software, the processes can execute on a system capable of running one or more custom operating systems or commercial operating systems such as the Microsoft Windows® operating systems, the Apple OS X® operating systems, the Apple iOS® platform, the Google Android™ platform, the Linux® operating system and other variants of UNIX® operating systems, and the like. The software can be implemented on a computer including a processing unit, a system memory, and a system bus that couples various system components including the system memory to the processing unit.

The system can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a solid state drive, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Interactive Media Presentations

The media presentations referred to herein can be structured in various forms. For example, a particular media presentation can be an online streaming video having multiple tracks or streams that a user can interactively switch among in real-time or near real-time. For example, a media presentation can be structured using parallel audio and/or video tracks as described in U.S. Patent Application Pub, No. 2016/0105724, published on Apr. 14, 2016, and entitled "Systems and Methods for Parallel Track Transitions," the entirety of which is incorporated by reference herein. More specifically, a playing video file or stream can have one or more parallel tracks that can be switched among in real-time automatically and/or based on user interactions. In some implementations, such switches are made seamlessly and substantially instantaneously (within milliseconds), such that the audio and/or video of the playing content can continue without any perceptible delays, gaps, or buffering. In further implementations, switches among tracks maintain temporal continuity; that is, the tracks can be synchronized to a common timeline so that there is continuity in audio and/or video content when switching from one track to another (e.g., the same song is played using different instruments on different audio tracks; same storyline performed by different characters on different video tracks, and the like).

Such media presentations can also include interactive video structured in a video tree, hierarchy, or other form or structure. A video tree can be formed by nodes that are connected in a branching, hierarchical, or other linked form. Nodes can each have an associated video segment, audio segment, graphical user interface (GUI) elements, and/or other associated media. Users (e.g., viewers) can watch a video that begins from a starting node in the tree and proceeds along connected nodes in a branch or path. Upon reaching a point during playback of the video where multiple video segments (child nodes) branch off from a segment (parent node), the user can interactively select the branch or path to traverse and, thus, the next video segment to watch.

As referred to herein, a particular branch or path in an interactive media structure, such as a video tree, can refer to a set of consecutively linked nodes between a starting node and ending node, inclusively, or can refer to some or all possible linked nodes that are connected subsequent to (e.g., sub-branches) or that include a particular node. Branched video can include seamlessly assembled and selectably presentable multimedia content such as that described in U.S. Patent Application Pub. No. 2011/0200116, published on Aug. 18, 2011, and entitled "System and Method for Seamless Multimedia Assembly", and U.S. Patent Application Pub. No. 2015/0067723, published on Mar. 5, 2015, and entitled "Methods and Systems for Unfolding Video Pre-Roll," the entireties of which are hereby incorporated by reference.

The prerecorded video segments in a video tree or other structure can be selectably presentable multimedia content; that is, some or all of the video segments in the video tree can be individually or collectively played for a user based upon the user's selection of a particular video segment, an interaction with a previous or playing video segment, or other interaction that results in a particular video segment or segments being played. The video segments can include, for example, one or more predefined, separate multimedia content segments that can be combined in various manners to create a continuous, seamless presentation such that there are no noticeable gaps, jumps, freezes, delays, or other visual or audible interruptions to video or audio playback between segments. In addition to the foregoing, "seamless" can refer to a continuous playback of content that gives the user the appearance of watching a single, linear multimedia presentation, as well as a continuous playback of multiple content segments that have smooth audio and/or video transitions (e.g., fadeout/fade-in, linking segments) between two or more of the segments.

In some implementations, different nodes in a video tree can have the same video segment, audio segment, UI elements, or other properties. For example, multiple nodes can use the same base video segment but have different audio playing or different UI elements depicted depending on which node in the tree the viewer has reached. As another example, shaders can be used to manipulate the base video segment based on user choices, with each different manipulation (user choice) resulting in a different path being traversed in the video tree and a different node being reached.

In some instances, the user is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. In some implementations, a decision period can extend over multiple multimedia segments. Decision points and/or periods can be predefined, occurring at fixed points or during fixed periods in the multimedia content segments. Based at least in part on the user's choices made before or during playback of content, one or more subsequent multimedia segment(s) associated with the choices can be presented to the user. In some implementations, the subsequent segment is played immediately and automatically following the conclusion of the current segment, whereas in other implementations, the subsequent segment is played immediately upon the user's interaction with the video, without waiting for the end of the decision period or the end of the segment itself.

If a user does not make a selection at a decision point or during a decision period, a default, previously identified selection, or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, stored user profiles (as further described below), preferred products or services, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the US will see the same beer commercial segment followed by an interview segment with a US citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments can form a seamless multimedia content path or branch, and users can take multiple paths over multiple play-throughs, and experience different complete, start-to-finish, seamless presentations. Further, one or more multimedia segments can be shared among intertwining paths while still ensuring a seamless transition from a previous segment and to the next segment. The content paths can be predefined, with fixed sets of possible transitions in order to ensure seamless transitions among segments. The content paths can also be partially or wholly undefined, such that, in some or all instances, the user can switch to any known video segment without limitation. There can be any number of predefined paths, each having any number of predefined multimedia segments. Some or all of the segments can have the same or different playback lengths, including segments branching from a single source segment.

Traversal of the nodes along a content path in a tree can be performed by selecting among options that appear on and/or around the video while the video is playing. In some implementations, these options are presented to users at a decision point and/or during a decision period in a content segment. Some or all of the displayed options can hover and then disappear when the decision period ends or when an option has been selected. Further, a timer, countdown or other visual, aural, or other sensory indicator can be presented during playback of content segment to inform the user of the point by which he should (or, in some cases, must) make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

A segment that is played after (immediately after or otherwise) a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video continue playing regardless of whether a segment selection is made, and no noticeable gaps appear in audio or video playback between any connecting segments. In some instances, the video continues on to another segment after a certain amount of time if none is chosen, or can continue playing in a loop.

In one example, the multimedia content is a music video in which the user selects options upon reaching segment decision points to determine subsequent content to be played. First, a video introduction segment is played for the user. Prior to the end of the segment, a decision point is reached at which the user can select the next segment to be played from a listing of choices. In this case, the user is presented with a choice as to who will sing the first verse of the song: a tall, female performer, or a short, male performer. The user is given an amount of time to make a selection (i.e., a decision period), after which, if no selection is made, a default segment will be automatically selected. The default can be a predefined or random selection. Of note, the media content continues to play during the time the user is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the user is presented with other choices at other decisions points, depending on which path of choices is followed. Ultimately, the user arrives at a final segment, having traversed a complete multimedia content path.

Interactive Media System Detailed Architecture

Figure 2:
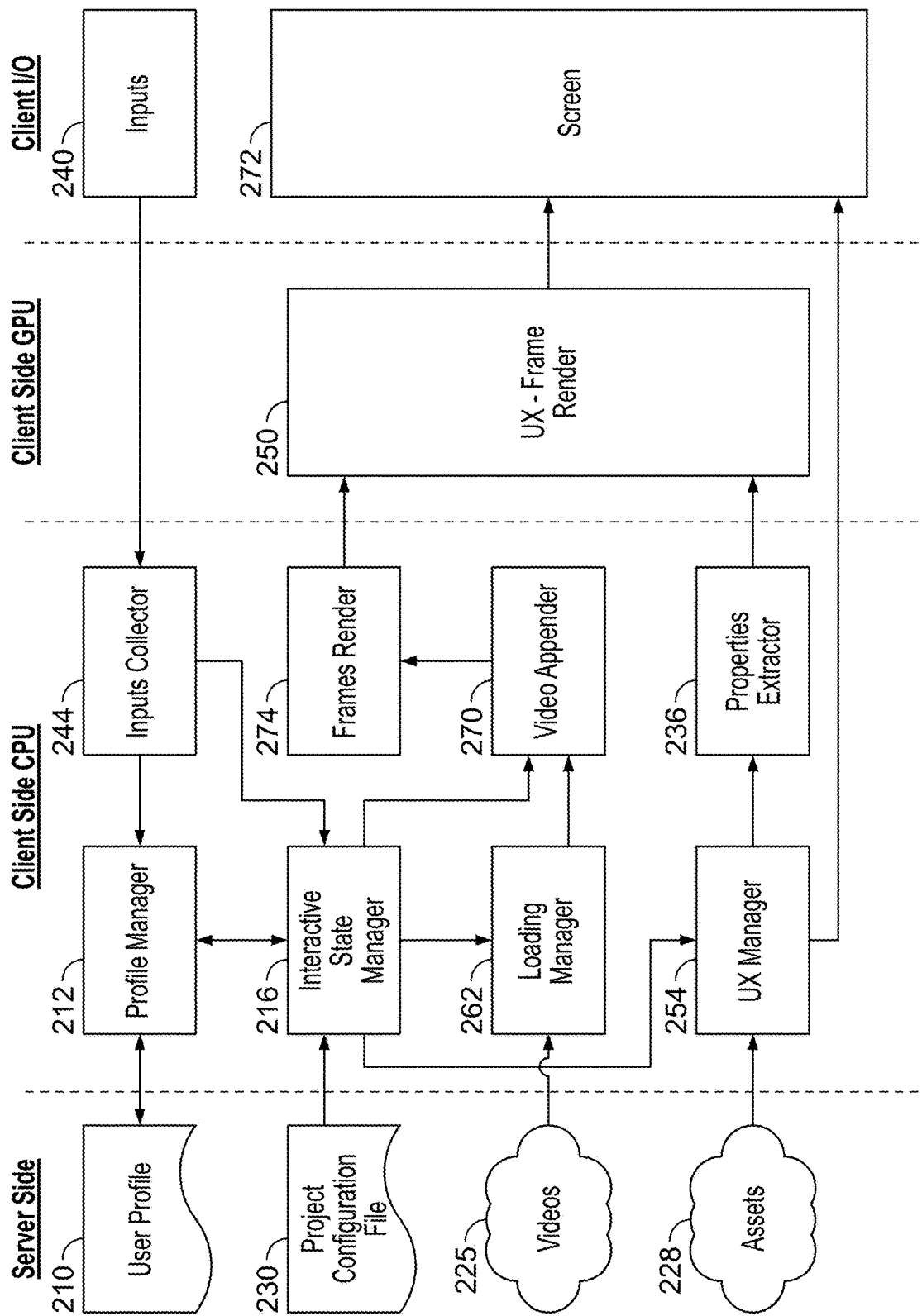
FIG. 2 depicts server-side and client-side components of an application for providing interactive video content, according to an implementation.

FIG. 2 depicts one implementation of a detailed architecture of components in application 112 on user device 110, including inputs received from remote sources, such as content server 102 and application server 106. Client side components include Profile Manager 212, Interactive State Manager 216, Inputs Collector 244, User Experience (UX) Manager 254, Loading Manager 262, Video Appender 270, Properties Extractor 236, and Frames Render 274. Profile Manager 212 receives user profile information from User Profile 210, which can exist locally on the client (user device 110) or, as depicted, be obtained externally from a remote server (e.g., content server 102 or application server 106). Profile Manager 212 can also provide information characterizing a user for storing back in User Profile 210. A different User Profile 210 can exist for each identifiable viewer of a media presentation, with each user identified by a unique ID and/or identification technique (e.g., a cookie stored locally on the user's device). Default user profile information can be provided when a viewer is anonymous or cannot otherwise be identified.

User Profile 210 can include information collected through a user's interaction with an interactive video and an interactive media player, as well as information obtained from other sources (e.g., detected location of user's device, information made available through a user's social media account, information provided by the user when creating an account with a provider of the interactive media player, and so on). Profile Manager 212 can use the information in User Profile 210 to cause the presentation of an interactive video to be dynamically modified, e.g., by adapting choices and content presented to the user to the user's previous or current behavior, or otherwise changing the presentation of the interactive video from its default state. For example, based on information in User Profile 210, Profile Manager 212 can direct Interactive State Manager 216 to select only a subset of choices (e.g., 2 of 3 choices) to provide to a viewer approaching a decision point, where Interactive State Manager 216 would otherwise provide a full set of choices (e.g., 3 of 3 choices) by default during presentation of the interactive video. Profile Manager 212 can also receive information from Inputs Collector 244 (this information can include, e.g., user interactions) and Interactive State Manager 216 (this information can include, e.g., a currently selected path in a video tree), which can be used to update User Profile 210. In some implementations, information in User Profile 210 can be used to modify the state of the interactive media player itself.

Inputs Collector 244 receives user inputs 240 from input components such as a device display screen 272, keyboard, mouse, microphone, virtual reality headset, and the like. Such inputs 240 can include, for example, mouse clicks, keyboard presses, touchpad presses, eye movement, head movement, voice input, etc. Inputs Collector 244 provides input information based on the inputs 240 to Profile Manager 212 and Interactive State Manager 216, the latter of which also receives information from Profile Manager 212 as well as a Project Configuration File 230 to determine which video segment should be currently played and which video segments may be played or presented as options to be played at a later time (e.g., influenced by information from the User Profile 210). Interactive State Manager 216 determines the interactive state of the presentation based on the Project Configuration File 230, inputs 240, start and end nodes, and other events in the system. Interactive State Manager 216 notifies Video Appender 270 of the current interactive state, and Video Appender 270 selects the video segment to be currently played based on the interactive state and seamlessly connects that video segment to the video stream being played in real time, via Frames Render 274, which renders the video frame-by-frame, as images. Interactive State Manager 216 notifies Loading Manager 262 of the current interactive state so that Loading Manager 262 (based on the interactive state and Project Configuration File 230) can retrieve video segments that may be played or presented as options to be played at a later time.

Project Configuration File 230 can include information defining the media presentation, which can include the video tree or other structure, video files, how video segments can be linked together in various manners to form one or more paths, external assets, and other project specific data. Project Configuration File 230 can further specify which audio, video, and/or other media files correspond to each segment (e.g., node in a video tree), that is, which audio, video, and/or other media should be retrieved when application 112 determines that a particular segment should be played. Additionally, Project Configuration File 230 can indicate interface elements that should be displayed or otherwise presented to users, as well as when the elements should be displayed, such that the audio, video, and interactive elements of the media presentation are synchronized. Project Configuration File 230 can be stored on user device 110 or can be remotely accessed by Interactive State Manager 216.

In some implementations, Project Configuration File 230 is also used in determining which media files should be loaded or buffered prior to being played (or potentially played). Because decision points can occur near the end of a segment, it may be necessary to begin transferring one or more of the potential next segments to viewers prior to a selection being made. For example, if a viewer is approaching a decision point with three possible branches, all three potential next segments can be preloaded partially or fully to ensure a smooth transition upon conclusion of the current segment. Intelligent buffering and progressive downloading of the video, audio, and/or other media content can be performed as described in U.S. Patent Application Pub. No. 2013/0259442, published Oct. 3, 2013, and entitled "Systems and Methods for Loading More Than One Video Content at a Time," the entirety of which is incorporated by reference herein.

Using information in Project Configuration File 230, Interactive State Manager 216 can inform UX Manager 254 which external assets 228 should be retrieved (e.g., buttons, pictures, animation, text, and other interface elements to be overlaid or incorporated into a video and displayed to viewers on screen 272). Properties Extractor 236 extracts properties relating to the external assets (e.g., dimensions, position, rotation, color, opacity, animation, etc.) 228 from the UX Manager 254 and sends the properties to UX-Frame Render 250. UX-Frame Render 250 communicates, directly or indirectly, with a device GPU to incorporate graphical changes into the individual frames rendered by Frames Render 274, prior to display on screen 272. The graphical changes can be based on information provided by Properties Extractor 236. UX-Frame Render 250 can use shaders to accomplish the foregoing.

In some implementations, UX-Frame Render 250 uses a framework or engine that provides graphics rendering operations. For example, Web Graphics Library (WebGL) frameworks, used for general purpose two-dimensional (2D) and three-dimensional (3D) graphics rendering over HTML5 canvas elements, can be used to animate image frames and, thereby, render video. Shader support allows such frameworks to be used to render UI elements and perform other graphical operations within image frames. Available frameworks include: (1) Three s (made available at threejs.org), a cross-browser JavaScript Application Programming Interface (API) used to create and display animated 3D computer graphics in a web browser; (2) Babylon.js (made available at babylonjs.com), a real-time 3D engine using a JavaScript library for displaying 3D graphics in a web browser; (3) Verge3D (made available at soft8soft.com), a real-time renderer and a toolkit used for creating interactive 3D experiences running on websites; and (4) Pixi.js (made available at pixijs.com), a 2D rendering library over WebGL. In addition, certain cross-platform game engines support WebGL over HTML5 canvas, and so can be used to render video and perform shader operations on the video. Examples include: (1) Unity (available at unity.com), a cross-platform game engine that supports rendering via WebGL/WebGL2; (2) Unreal Engine (available at unrealengine.com), an engine that supports WebGL-based rendering through WebAssembly; and (3) Godot Engine (available at godotengine.org), which supports rendering via WebGL2.

Project Configuration File 230 can further indicate the specific timings for which actions can be taken with respect to the interface elements (e.g., when a particular element is active and can be interacted with). The interface elements can include, for example, playback controls (pause, stop, play, seek, etc.), segment option selectors (e.g., buttons, images, text, animations, video thumbnails, and the like, that a viewer can interact with during decision periods, the selection of which results in a particular multimedia segment being seamlessly played following the conclusion of the current segment), timers (e.g., a clock or other graphical or textual countdown indicating the amount of time remaining to select an option or next segment, which, in some cases, can be the amount of time remaining until the current segment will transition to the next segment), links, popups, an index (e.g., for browsing and/or selecting other multimedia content to view or listen to), and/or a dynamic progress bar such as that described in U.S. Patent Application Pub. No. 2014/0082666, published Mar. 20, 2014, and entitled "Progress Bar for Branched Videos," the entirety of which is incorporated by reference herein. In addition to visual elements, sounds or other sensory elements can be presented. For example, a timer can have a "ticking" sound synchronized with the movement of a clock hand. The interactive interface elements can be shared among multimedia segments or can be unique to one or more of the segments.

In addition to reading information from Project Configuration File 230, Interactive State Manager 216 is notified of user interactions (e.g., mouse clicks, keyboard presses, touchpad presses, eye movements, etc.) from Inputs Collector 244, which interactions can be translated into actions associated with the playback of a media presentation (e.g., segment selections, playback controls, etc.). Based thereon, Interactive State Manager 216 notifies Loading Manager 262, which can process the actions as further described below. Interactive State Manager 216 can also interface with Loading Manager 262 and Video Appender 270. For example, Interactive State Manager 216 can listen for user interaction information from Inputs Collector 244 and notify Loading Manager 262 when an interaction by the viewer (e.g., a selection of an option displayed during the video) has occurred. In some implementations, based on its analysis of received events, Interactive State Manager 216 causes the presentation of various forms of sensory output, such as visual, aural, tactile, olfactory, and the like.

As earlier noted, Interactive State Manager 216 can also notify Loading Manager 262 of the current interactive state, which can indicate which video segments may be played at a later time, and Loading Manger 262 can retrieve the corresponding videos 225 (whether stored locally or on, e.g., content server 102) to have them prepared for potential playback through Video Appender 270 and Frames Render 274. Interactive State Manager 216 and Loading Manager 262 can function to manage the downloading of hosted streaming media according to a loading logic. In one implementation, Interactive State Manager 216 receives information defining the media presentation structure from Project Configuration File 230 and, using information from Inputs Collector 244 and Profile Manager 212, determines which media segments to download and/or buffer (e.g., if the segments are remotely stored). For example, if Interactive State Manager 216 informs Loading Manager 262 that, based on the current interactive state, a particular segment A will or is likely to be played at an upcoming point in the presentation timeline, Loading Manager 262 can intelligently request the segment for download, as well as additional media segments X, Y and Z that can be played following segment A, in advance of playback or notification of potential playback thereof. The downloading can occur even if fewer than all of X, Y, Z will be played (e.g., if X, Y and Z are potential segment choices branching off segment A and only one will be selected for playback).

In some implementations, Loading Manager 262 ceases or cancels downloading of content segments or other media if it determines that it is no longer possible for a particular media content segment (or other content) to be presented on a currently traversed media path. Referring to the above example, a user interacts with the video presentation such that segment Y is determined to be the next segment that will be played. The interaction can be received by Interactive State Manager 216 and, based on its knowledge of the path structure of the video presentation, Loading Manager 262 is notified to stop active downloads or dequeue pending downloads of content segments no longer reachable now that segment Y has been selected.

Video Appender 270 receives media content from Loading Manager 262 and instructions from Interactive State Manager 216 on which media segments to include in a media presentation. Video Appender 270 can analyze and/or modify raw video or other media content, for example, to concatenate two separate media streams into a single timeline. Video Appender 270 can also insert cue points and other event markers, such as junction events, into media streams. Further, Video Appender 270 can form one or more streams of bytes from multiple video, audio or other media streams, and feed the formed streams to Frames Render 274 such that there is seamless playback of the combined media content on display screen 272 (as well as through speakers for audio, for example).

In some implementations, application 112 tracks information regarding user interactions, users, and/or player devices, and stores the information in a database. Collected analytics can include, but are not limited to: (1) device information, such as number, type, brand, model, device location, operating system, installed software, browser, browser parameters, user agent string, screen size, bandwidth, and network connection parameters; (2) user tracking and demographic data, such as login information, name, address, age, sex, referrer, uniform resource locator (URL), urchin tracking module (UTM) parameters; (3) user or automated action information, such as button/touchpad presses, mouse clicks, mouse/touchpad movements, action timings, media player controls (play, pause, volume up/down, mute, full screen, minimize, seek forward, seek backward, etc.), link outs, shares, rates, comments; (4) information associated with interactions with interactive media content, such as decisions made by users or made automatically (e.g., content segment user choices or default selections), starting a node, ending a node, and content paths followed in the presentation content structure; and (5) information associated with media playback events and timing, such as loading events, buffering events, play and pause events. The analytics can include those described in U.S. Patent Application Pub. No. 2011/0202562, entitled "System and Method for Data Mining within Interactive Multimedia," and published Aug. 18, 2011, the entirety of which is incorporated by reference herein. In one instance, some or all of these analytics are included in or used to inform attributes in User Profile 210.

As earlier described, the transition between multimedia segments in an interactive media presentation can be seamless such that there is no noticeable gap or change in audio, video, and/or context between the segments. For example, with respect to audio, a seamless transition can include voices, music, or other sounds continuing uninterrupted from one segment to the next, or otherwise not having noticeable breaks or interruptions between segments. With respect to video, a seamless transition can include video content continuing uninterrupted from one segment to the next, visually (e.g., the segments, when joined together, appear to be one continuous video) and/or contextually (e.g., the segments depict different scenes in a continuous storyline). Normally, to effect a seamless transition between two segments, the end of one segment (or the end of a decision period) has to join seamlessly to the next segment. When the transition occurs at the end of a decision period, the user experiences a delay between making a decision and seeing the effect of the decision.

Various techniques can be used to address the issue of transition delay and create seamless transitions that feel immediate to the user (e.g., occurring in less than 1 second after the user's decision, or other reasonably imperceptible delay). In one implementation, to create a seamless audio transition between two segments in a media presentation, audio content is muted or faded out during the decision period in the first segment. Once a decision is made during the decision period, the presentation immediately transitions to a different segment corresponding with the decision and audio is resumed (e.g., unmuted or increased in volume). In another implementation, some of the audio in the first segment replaces audio in the next segment. For example, if a user makes a decision with two seconds left in the decision period of the first segment, the presentation can immediately transition to the next segment, but the audio associated with the two seconds remaining in the decision period is then played instead of the two seconds of audio that would normally be played at the beginning of the next segment. It should be appreciated, however, that a shorter period of audio than that remaining in the decision period can be substituted at the beginning of the next segment. To ensure a fully seamless transition, the audio associated with the next segment can be formed to allow for such substitutions without resulting in a noticeable skip or gap in audio.

Shaders in Interactive Media Presentations

One of skill in the art will appreciate the numerous ways in which the videos described herein can be manipulated using shaders. For example, shaders can be used in interactive video to apply real-time graphical effects, such as altering the color of objects or scenery in the video in response to viewer interactions. As another example, interface elements, such as those described above, can be graphically incorporated into video using shader code, rather than overlaying the elements on top of the video using HTML, for example.

Figure 3:
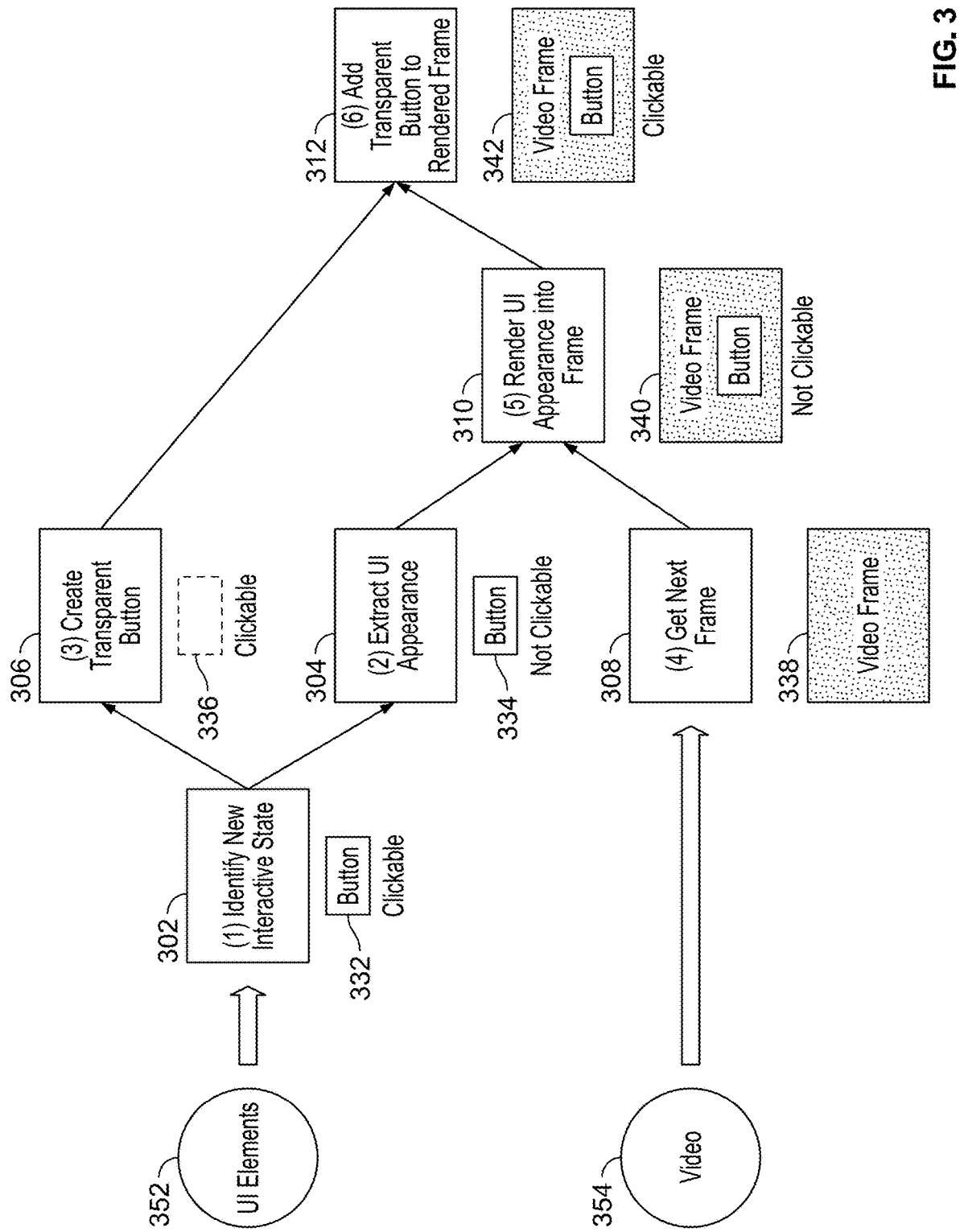
FIG. 3 depicts an example method for rendering user interface elements in interactive video using shaders.

FIG. 3 depicts an example method for rendering UI elements in interactive video using shaders. During presentation of an interactive video, a new interactive state is identified (Step 302) (see Interactive State Manager 216, described above). The interactive state can include various properties associated with the current state of the video, including the current node of the viewer within the video tree, node start, node end, paths in the tree taken by the viewer, choices selected, other interactions that affect the interactive state, and so on. The interactive state can also include properties associated with UI elements 352 displayed to a viewer during presentation of the interactive video. For example, the interactive state can include one or more of the following: (1) UI element appears, (2) UI element disappears, (3) UI element hovered, (4) UI element no longer hovered, (5) UI element selected, (6) UI element de-selected, (7) UI element animation start, and (8) UI element animation stop. In FIG. 3, an interactive button 332 is used as the UI element for purposes of illustration; however, it is to be appreciated that nearly any UI element (e.g., slider, switch, index, timer, etc.) can be rendered in a similar manner.

In Step 304, the current properties of UI elements in the new interactive state are determined by Properties Extractor 236, including any properties of the elements that changed with the new interactive state. In this example, the static appearance of the button (i.e., a non-interactive button 334) as it exists in the new interactive state is extracted. Properties of UI elements can include, but are not limited to, dimensions (e.g., width and height), position (e.g., x, y, and z coordinates), rotation, color, opacity, animation (e.g., current or next frame of animation), video asset (e.g., current or next frame of video), item type, character, video bitmap change, and so on. If the UI element is interactive (e.g., tappable, clickable, etc.), a transparent element with the same or similar position and dimensions as the UI element is created (Step 306), and the transparent element is configured to be interactive. As shown in FIG. 3, a transparent, clickable button 336 having the same dimensions and position as button 332 is created.

In Step 308, the next video frame 338 from the video 354 is identified (e.g., by Frames Render 274). In one implementation, WebGL is used to render the video 354 frame-by-frame on an HTML, canvas element as a sequence of images. Proceeding into Step 310, the non-interactive UI element (here, non-interactive button 334) is rendered into video frame 338. For example, UX-Frame Render 250 can use shaders to instruct a GPU to draw non-interactive button 334 into video frame 338 to create a non-interactive composite video frame 340. To make the UI element rendered into the frame interactive, a transparent interactive UI element is layered on the non-interactive UI element (Step 310). As shown in FIG. 3, the clickable transparent button 336 is layered on the non-interactive button element in the non-interactive composite video frame 340, resulting in an interactive composite video frame 342 with a clickable button.

The technique described with respect to FIG. 3 can be used to dynamically incorporate UI elements and other graphical assets and features into video. Such other graphical features can include manipulation of opacity, coloring, texture and animation in real-time using shaders. For example, in a character selection screen in an interactive video, all unselected characters can be blurred using shader effects. In addition, complex effects can be added to video through shaders such as animations with easing functions and varying opacity, real-time color changes, complex texturing, and pixel-based effects. When the assets being incorporated into a video are animations or other videos, shader-based operations can include: (1) rendering video in the foreground over UI elements while one or more videos are playing in the background, (2) rendering multiple videos on the same canvas element, (3) blending video streams, and (4) transitioning from one video stream to another, including through graphical transition effects. Incorporated video and animation properties can also change based on the content of the video or animation. For example, if the incorporated animation is a moving bus, the rendering location for the animation within the video frame can change over time as the animation shows the bus driving in a particular direction, thereby corresponding with the movement of the bus.

Figure 4:
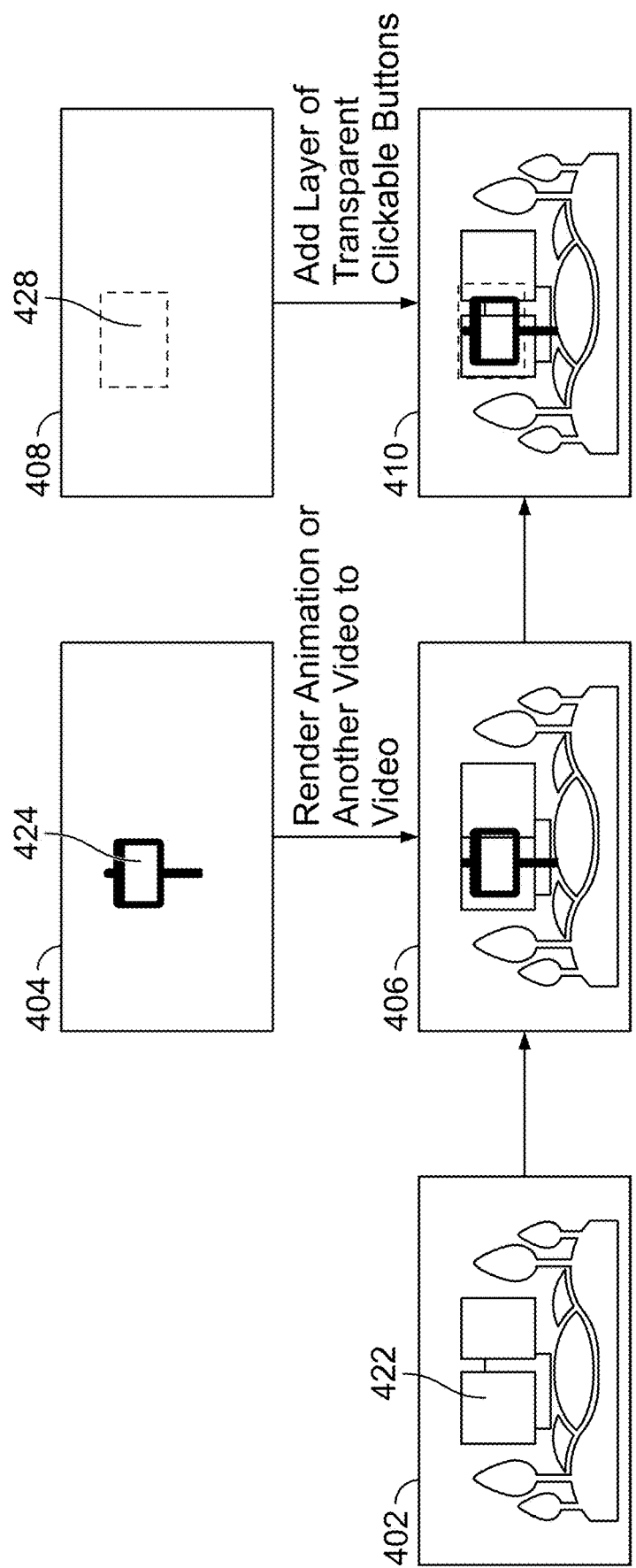
FIG. 4 depicts an example of rendering animation or video into an interactive video using shaders.

FIG. 4 depicts an example of rendering animation or video into an interactive video using shaders. Video frame 402 has a defined area 422 into which animation or video can be rendered. However, specific areas within the frames need not be defined, and an animation or video element can be rendered into a video frame based on properties associated with the element, such as x and y coordinates and dimensions. Video frame 402 is one of multiple frames in a sequence of frames forming a video of a landscape. Video frame 404 includes an image of a sign. Video frame 404 is one of multiple frames in a sequence of frames forming a video of an animated sign 424. A shader operation is used to render the sign 424 in frame 404 into defined area 422 of the landscape video frame 402, thereby forming a non-interactive composite video frame 406 depicting the landscape and sign 424 in combination. Similar to the process depicted in FIG. 3, to make the non-interactive composite video frame 406 interactive, a transparent layer 408 with an interactive element 428 (e.g., a clickable button) is added on top, resulting in interactive video frame 410. The process can continue on a frame-by-frame basis, using shader operations to render each frame of the animated sign 424 into corresponding frames of the landscape.

In some implementations, the resulting video after shader operations have been performed has elements that are incorporated into the video frame using shaders, as well as elements that are layered on top of the video (e.g., using HTML5) without being "baked in" with shaders. In some implementations, the resulting video has one or more transparent areas such that a background area is visible through the transparent areas of the resulting video when it is played. In some implementations, multiple videos and UI/UX elements are used to form a single interactive video. When the interactive video is played over a network using a player application, the player application can download multiple different videos from one or more sources to include in the interactive video. In another implementation, the player application can access multiple different videos existing within a single video (e.g., each video frame is split into different videos). Examples of the foregoing are described in U.S. Patent Application Pub. No. 2015/0104155, published Apr. 16, 2015, and entitled "Systems and Methods for Real-Time Pixel Switching," the entirety of which is incorporated by reference herein. Ultimately, an interactive presentation is formed that is seamless across audio and/or video.

Figure 5:
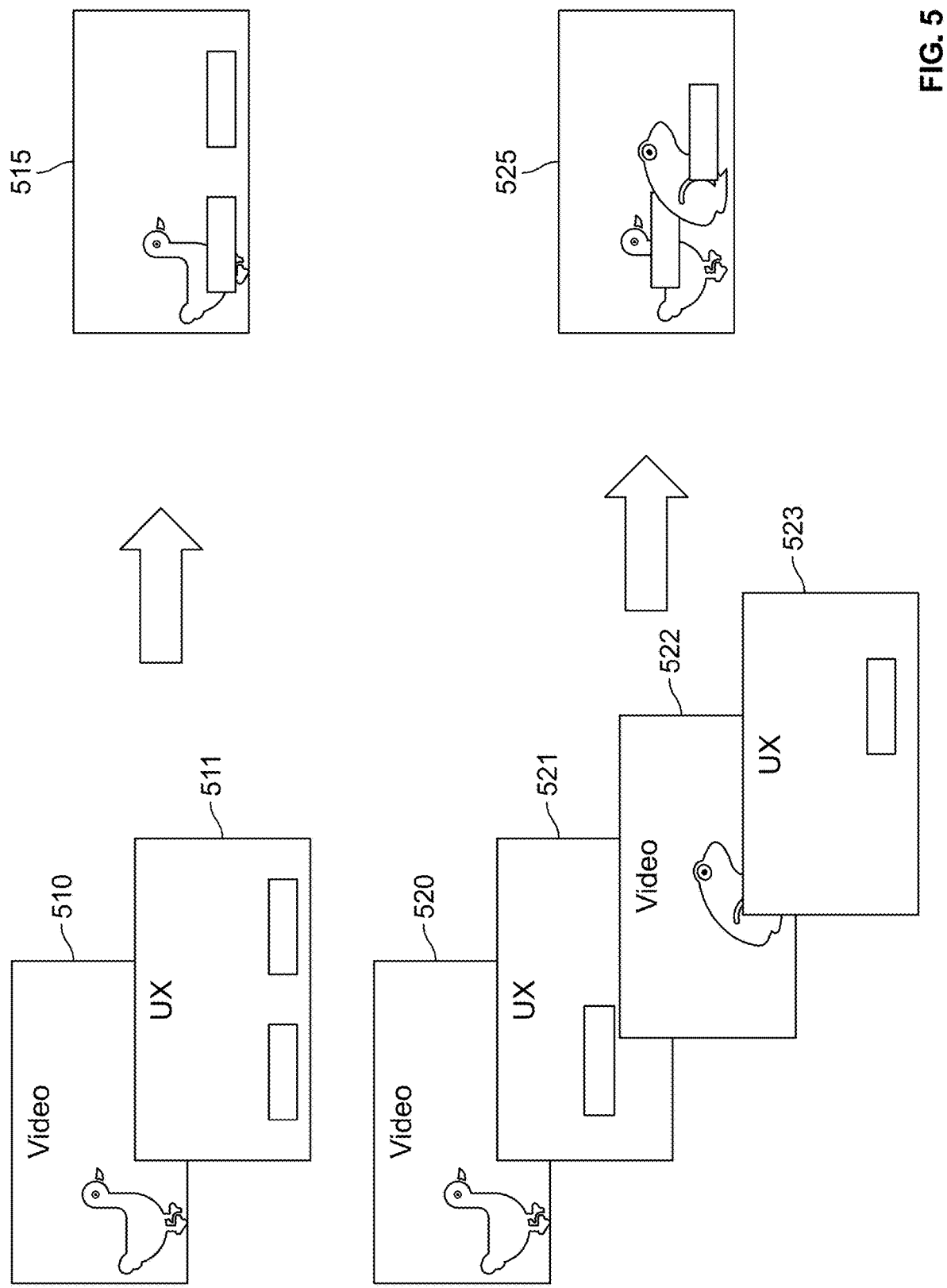
FIG. 5 depicts non-shader-based and shader-based approaches to providing interactive video.

In some implementations, shader operations are used for more complex layering and compositing operations. The top portion of FIG. 5 depicts a typical non-shader based approach to form an interactive video 515 by adding a UX layer 511 to a video layer 510. This approach can be accomplished by, for example, layering the UX elements on top of an HTML5 canvas over the video 510. However, this technique is limited in that all of the UX components are in the foreground with respect to the video (i.e., layered over all of the video). The bottom portion of FIG. 5 depicts a shader-based approach where multiple graphical elements (video and UX layers 520-523) can be composited to form an interactive video 525 in which UX elements can be disposed in front of and behind video elements. As shown, the duck video 520 is rendered first as the background, and shader operations are used to render the first UX element 521, then the frog video 522, and, finally, the second UX element 523. As a result, the interactive video 525 appears to have the first UX element 521 in front of the duck video 520, but behind the frog video 522. The second UX element 523 is in the foreground, in front of everything else. Different layers can be assigned different depth (z-index) values, and the depth values are used to determine the order in which the layers are rendered with respect to one another. In FIG. 5, the duck video 520 can have depth value=0, the first UX element 521 can have depth value=1, the frog video 522 can have depth value=2, and the second UX element 523 can have depth value=3. Some layers can have the same depth value and can be rendered at the same level.

Figure 6:
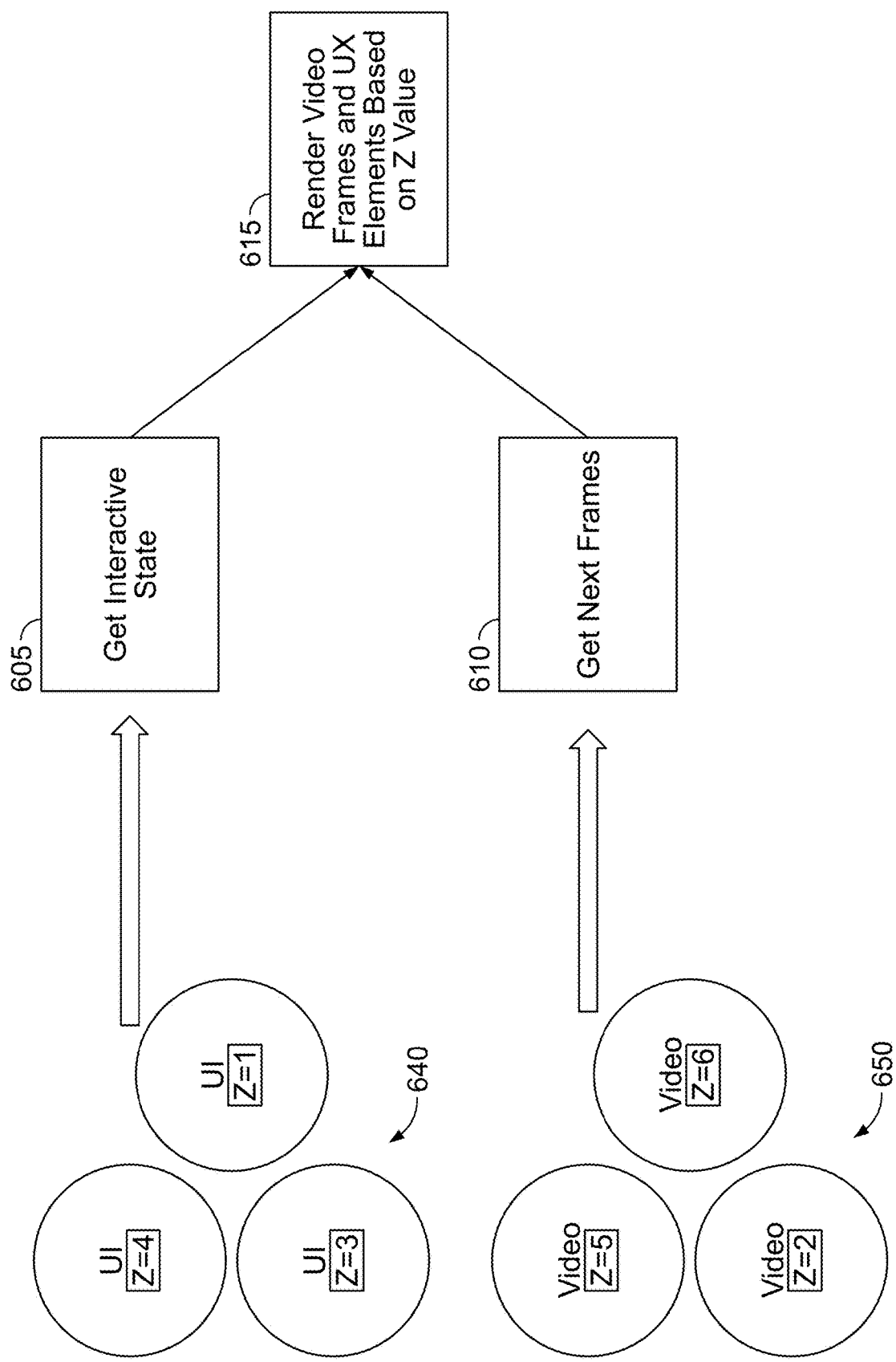
FIG. 6 depicts an example process for shader-based rendering of layers with varying depths in real-time.

In some implementations, the depth value for a particular layer is fixed. In other implementations, the depth value for a particular layer dynamically varies based on the interactive state of an interactive video presentation, properties associated with the device being used to view the presentation, or other factors. FIG. 6 depicts an example process for shader-based rendering of layers with varying depths in real-time. In Step 605, the interactive state is obtained. Step 605 can be performed continuously on a video frame-by-frame basis, every N frames (e.g., 2 frames, 5 frames, 15 frames, etc.), every N seconds (e.g., 0.1 seconds, 0.5 seconds, 1 second, 2 second, etc.), or other interval. In Step 610, the frames of each video layer 650 to be rendered into the interactive video are obtained. In one example, at time T=30.5 seconds in the interactive video, the interactive state at that time (T=30.5 s) and the frame of each of the video layers 650 to be displayed at that time (T=30.5 s) are obtained. In Step 615, the UI elements 640 and the obtained frames of video layers 650 are rendered as a frame of the interactive video by their depth (Z) values. As shown in FIG. 6, the UI elements include elements to be rendered at depth levels 1, 3, and 4, and the video layers 650 include video to be rendered at depths 2, 5, and 6. The process can be repeated for each rendered frame of the interactive video. In some implementations, rendering is performed in advance of the rendered frames being displayed, thereby buffering video for later presentation in the interactive video.

As one example of dynamically varying rendering depths, if a viewer of an interactive video hovers over an interactive user interface element that is rendered in or toward the background, the depth value associated with that element can be changed to render it in or closer to the foreground in further frames of the interactive video. As another example, if a viewer of an interactive video selects an option to drive a bus instead of a car, video associated with the bus can be moved toward the foreground and/or video of the car can be moved toward the background, in each case by adjusting the depth value of the applicable video layer. As a result, both the bus and car videos can continue to be displayed simultaneously in the interactive video, but the car video will appear behind the bus video (and behind any other video, UX or other layers having a depth level closer to the foreground than the car video). As another example, video and UI elements can be rendered at different depths depending on whether the viewer is watching an interactive video on an iPhone versus other mobile phone brands.

Filter Framework

The filter framework that will now be described allows for the manipulation and editing of a video in real-time, while it is playing (e.g., changing the colors of the walls of a room, blurring a background, etc.). The filter framework can use a mask encoded into the video that is then decoded during playback and used to perform graphical operations on the video. Advantageously, because the mask is part of the video, it can change from frame-to-frame, for example, to correspond to changes in the viewable video.

In one implementation, metadata is encoded into individual frames of a video (e.g., every frame, every other frame, every X frames, etc.). The metadata can be encoded via red-green-blue (RGB) values, for example. The video frames that include metadata can have one or more regions of the frame allocated to video and one or more regions of the frame allocated to metadata. When the video is played, some or all of the metadata regions in a particular frame are combined with some or all of the video regions in that frame. Based on the metadata in the metadata regions, graphical operations are performed on the corresponding video regions that the metadata regions are combined with. In one example, a frame of a video includes a video region making up 75% of the area of the frame, with a metadata region in the form of a pixel mask making up the remaining 25%. While the video is played, the metadata region is collapsed into the video region so that the video has the dimensions of the video region. The metadata region can remain the same size and overlap with a portion of the video region, or the metadata region can be resized (e.g., stretched to cover a larger portion of or the entire video region). The RGB values of the pixels in the mask of the metadata region can be used to determine the particular operations to perform. For example, individual bits of a pixel in particular combinations can specify a graphical add operation, subtract operation, multiply operation, mask operation, and so on. The existing pixel color in the video region can be used as input to a shader that performs the desired operation and outputs the resulting pixel color. Other inputs can be provided to the shader (e.g., a different pixel color that the existing pixel color should be blended with). Multiple shaders can be chained together to produce a final effect.

Figure 7A:
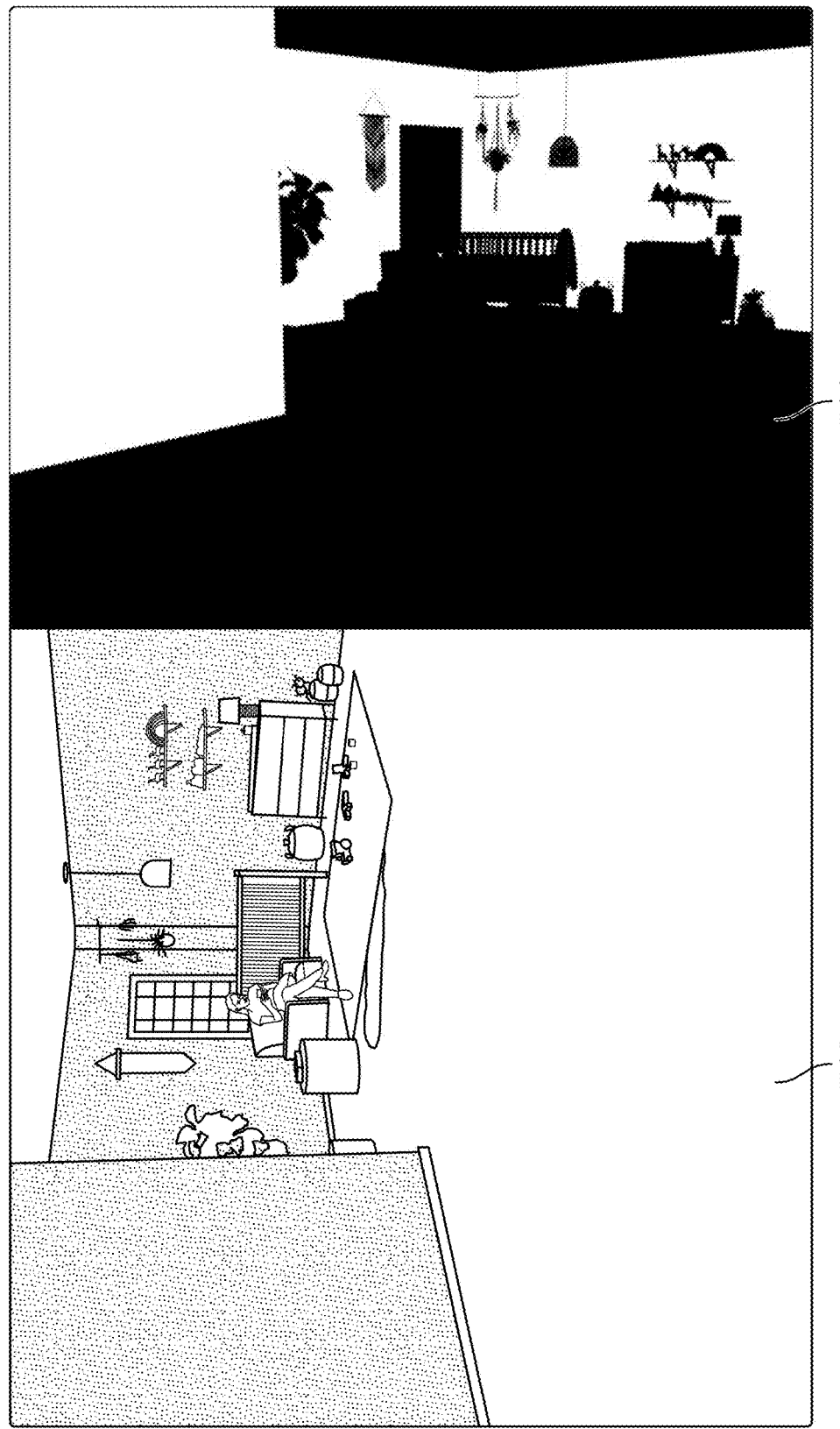

FIGS. 7A-7D depict an example of a use of the foregoing technique where the intent is to change wall color of a room in a video in real-time while the video is playing. User interface elements can be provided that allow the viewer to select different colors and see the color of the walls in the video change in real-time substantially immediately following the color selection. Referring to FIG. 7A, the video frame 700 includes a viewable region 710 comprising video and a comparatively smaller non-viewable region comprising a mask 720. In this example, the mask 720 fills the entire non-viewable region; however, this is not a requirement. The mask 720 is rotated in one direction ninety degrees with respect to the video in the viewable region 710 to utilize the full dimensions of the video frame 700. It should be noted, however, that the numbers, dimensions, and respective placements of the viewable and non-viewable regions in the video frame 700 are illustrative, and variations are contemplated For example, there can be multiple viewable regions and multiple non-viewable regions. As another example, a viewable region and non-viewable region can have the same dimensions, the same width, the same height, or entirely different dimensions. As another example, the non-viewable region need not be rotated with respect to the viewable region.

Figure 7B:
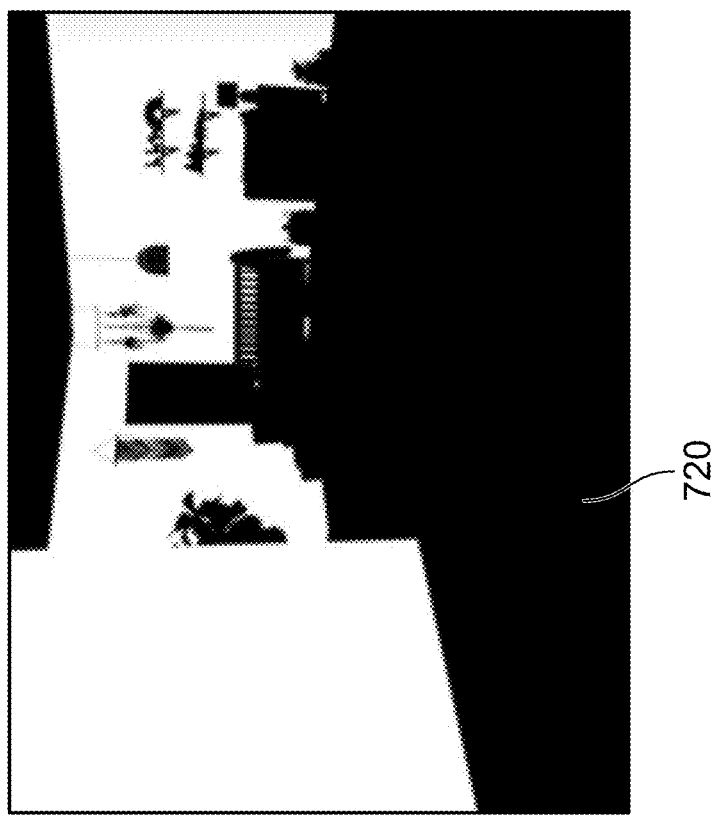
Figure 7B:
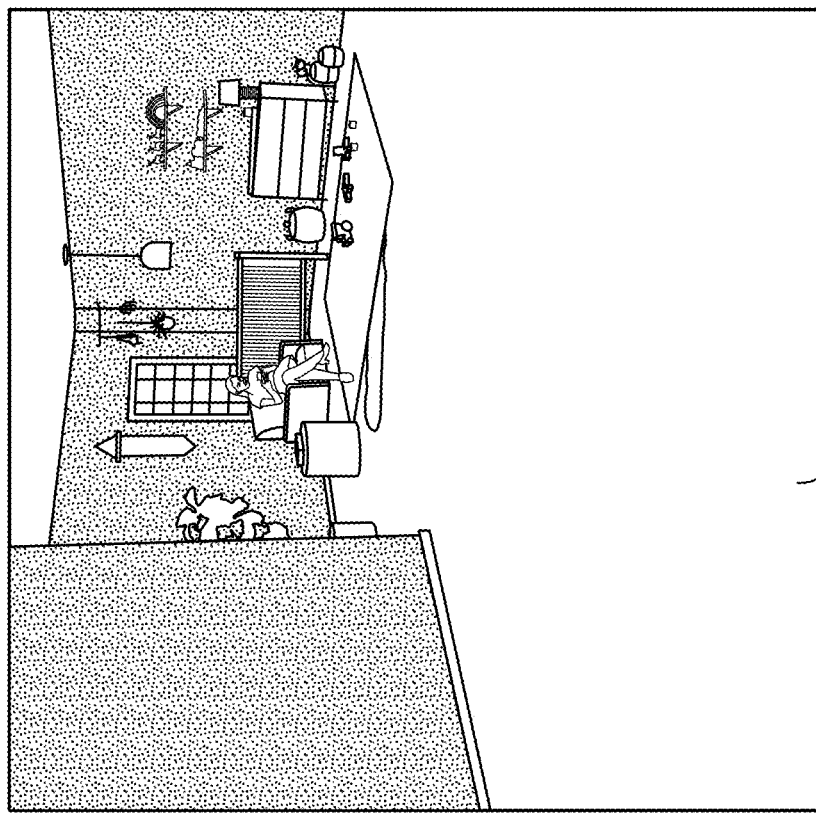

Now referring to FIG. 7B-7C, while a video containing the frame is being played for a viewer, prior to the frame being displayed, the mask 720 is separated from the original frame, rotated ninety degrees in the opposite direction, superimposed onto the viewable region 710, and then aligned to fit back in the original frame size. In this example, the viewable region 710 is square and the mask 720 has the same width as the viewable region 710, but has a smaller height than the viewable region 710. As such, when rotated and aligned with the top of the viewable region 710, the mask 720 does not fully cover the viewable region 710. Because the mask 720 defines where graphical operations are performed in the viewable region 710, it has no effect on the lower portion 740 of the viewable region 710 not covered by the mask 720. The mask 720 is used to designate where graphical operations should be performed. No operations are performed on pixels covered by the black-colored area of the mask 720, while the white-colored areas of the mask 720 designate the areas where operations are performed. For example, each pixel covered by a white-colored area in the mask 720 can be altered based on a color replacement algorithm. The color replacement algorithm can be a graphical operation performed by a GPU.

Figure 7D:
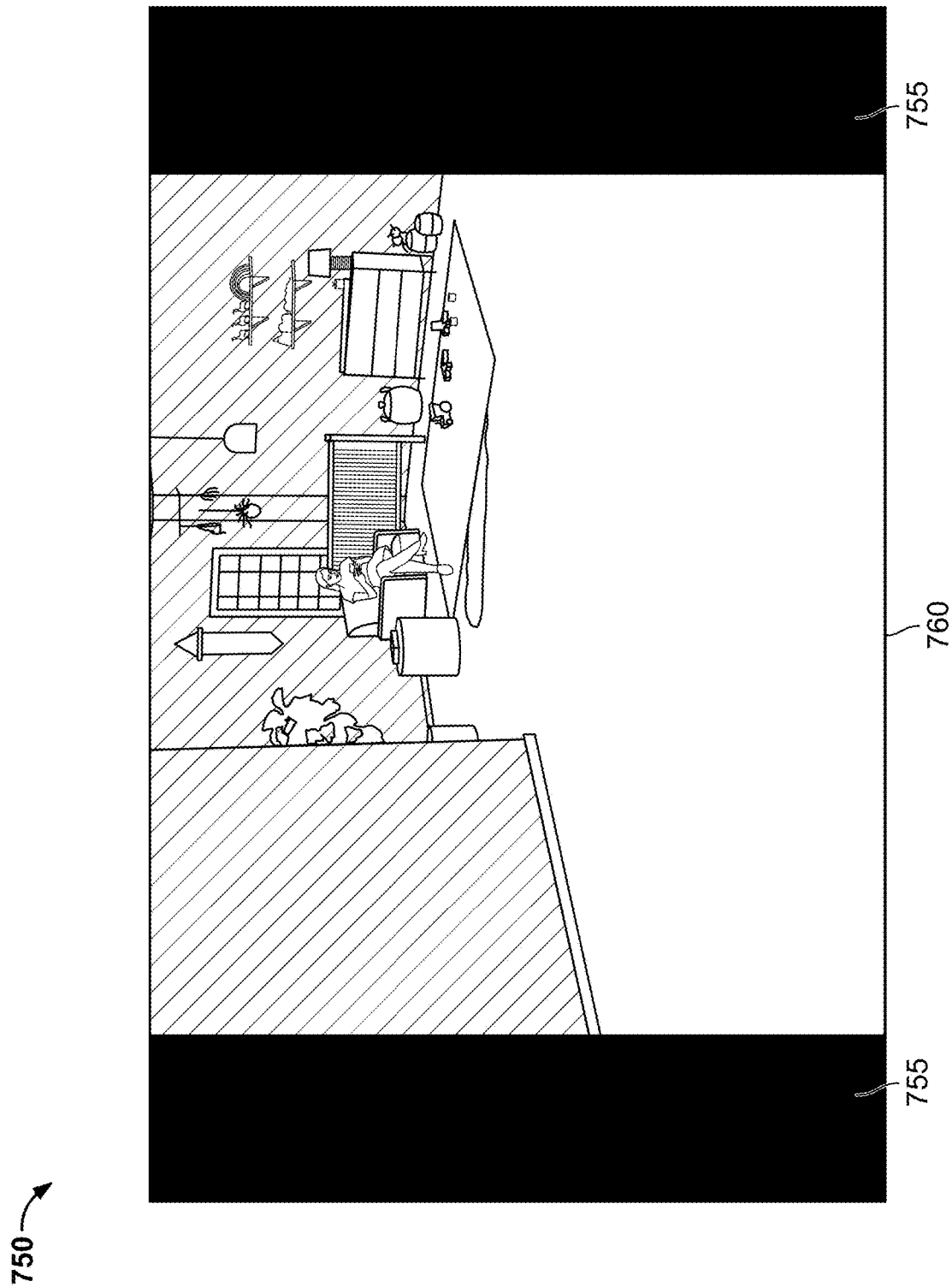

FIG. 7D depicts the video frame 750 resulting from the graphical operations, in which the walls of the room have changed color. The viewable region 760 in the resulting video frame 750 has smaller dimensions than the initial video frame 700 (here, the viewable region 760 is square-shaped and has the same height as the initial video frame 700 but a smaller width). As such, the viewable region 760 is centered in the resulting video frame 750 with black bars on either side 755. In some implementations, the video player that plays the video recognizes a designated viewable area for the video and crops or resizes the video so only the designated viewable area is seen. For example, some or all of viewable region 760 can be made visible to a viewer of the video whereas the black bars 755 (and potentially some of the viewable region 760) can be hidden. The above operations can be repeated for multiple consecutive frames in a video to graphically manipulate the video in real-time.

In one implementation, the filter framework is built on HTML5 canvas and WebGL technologies and allows filters (e.g., WebGL shaders) to be composed and connected together to perform multiple shader-based operations. The framework can provide built-in filters (e.g., mask, blur, color replace, video replace, crop, resize, rts, etc.) which have customizable parameters (e.g., blur amount, crop frame, etc.). The framework can provide a mechanism that allows a user to define a filter graph or how filters connect to each other. In one implementation, the mechanism is a JavaScript Object Notation (JSON) language. For example, if the user specifies [mask, blur] as the filter graph, the original video would be masked out and then blurred, resulting in a blurry mask.

Referring back to the example depicted in FIGS. 7A-7D, a filter graph can be defined that includes three filters: VideoResize (isolates the square viewable region 710), MaskResize (isolates and rotates the mask 720 in the non-viewable region), and ColorReplace (changes the color of the masked out areas in the viewable region 710). In one implementation, the filter graph is defined using JSON, as follows:

```
let filters = {
    ColorReplace: {
        type: 'colorreplace',
        options: {
            replacementColor: 'rgb(255, 255, 255)',
            mainColor: "rgb(196,182,174)",
            edgeTolerance: 0.98,
            enableSpill: false
        }
    },
    MaskResize: {
        type: 'resize',
        options: {
            rotate: -90,
            newframe: {
                x: 0.0,
                y: 0,
                width: 0.5625,
                height: 1.0
            },
            originalFrame: {
                x: 0.564,
                y: 0.0,
                width: 0.436,
                height: 1.0,
            },
            fitToFrame: true
        }
    },
    VideoResize: {
        type: 'resize',
        options: {
            rotate: 0,
            newframe: {
                x: 0.0,
                y: 0,
                width: 0.564,
                height: 1.0
            },
            fitToFrame: false
        }
    },
    Chroma: {
```

```
            type: 'composite',
            options: {
              graph: [
                {
                  type: 'VideoResize',
                  inputs: ['video'],
                  outputs: ['videoOutput']
                },
                {
                  type: 'MaskResize',
                  inputs: ['video']
                },
                {
                  type: 'ColorReplace',
                  inputs: ['videoOutput','previous']
                }
              ]
            }
          },
        };
        let app = new VideoFilterApplication(player, filters);
        app.applyGraph('Chroma');
```

Figure 8:
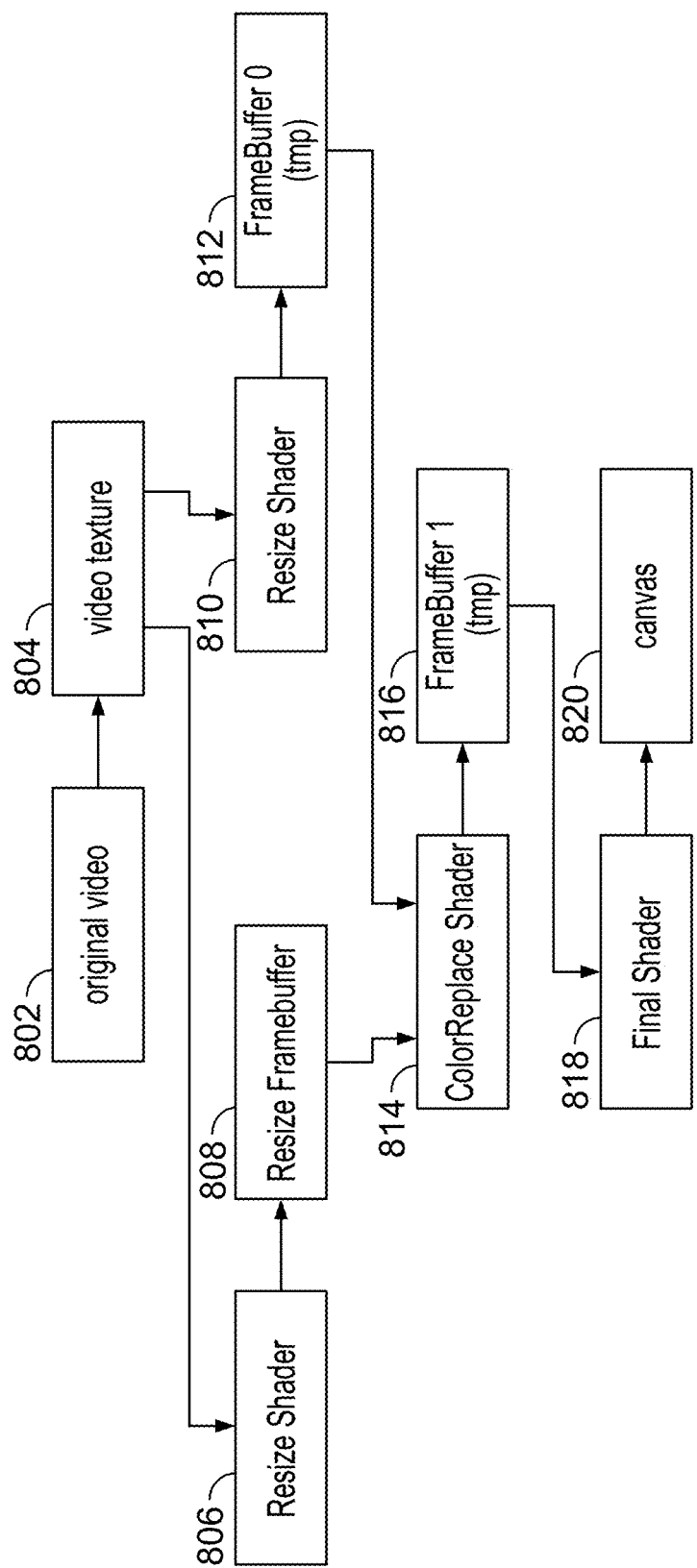
FIG. 8 depicts an implementation of a filter graph within a filter framework.

FIG. 8 depicts an implementation of the above-described filter graph within the filter framework. The framework uses shaders, textures, and framebuffers in order to composite multiple effects. Here, a filter is a shader that manipulates the pixels of some input, such as a texture. The output, which can also be a texture, is stored in a temporary framebuffer or a saved framebuffer. If the output is in a saved framebuffer, the output can be accessed at any point during the rendering process. If the output is in a temporary framebuffer, the output can only be accessed by the next shader in the rendering pipeline. From the original video 802, a texture is extracted 804 (e.g., video frame 700 in FIG. 7A). Resize shader 806 (e.g., the VideoResize filter) isolates the viewable video region (e.g., viewable region 710) and places the isolated region output texture into resize framebuffer 808. Resize shader 810 (e.g., the MaskResize filter) isolates and rotates the non-viewable region (e.g., mask 720) and places the isolated, rotated output texture into temporary framebuffer 812. ColorReplace shader 814 (e.g., the ColorReplace filter) uses the output stored in each framebuffer 808 and 812 to change the color of the masked-out region in the viewable video region, and stores the resulting texture in temporary framebuffer 816. Final shader 818 can optionally perform additional shader operations on the texture in temporary framebuffer 816 prior to rendering on canvas 820.

Figure 9:
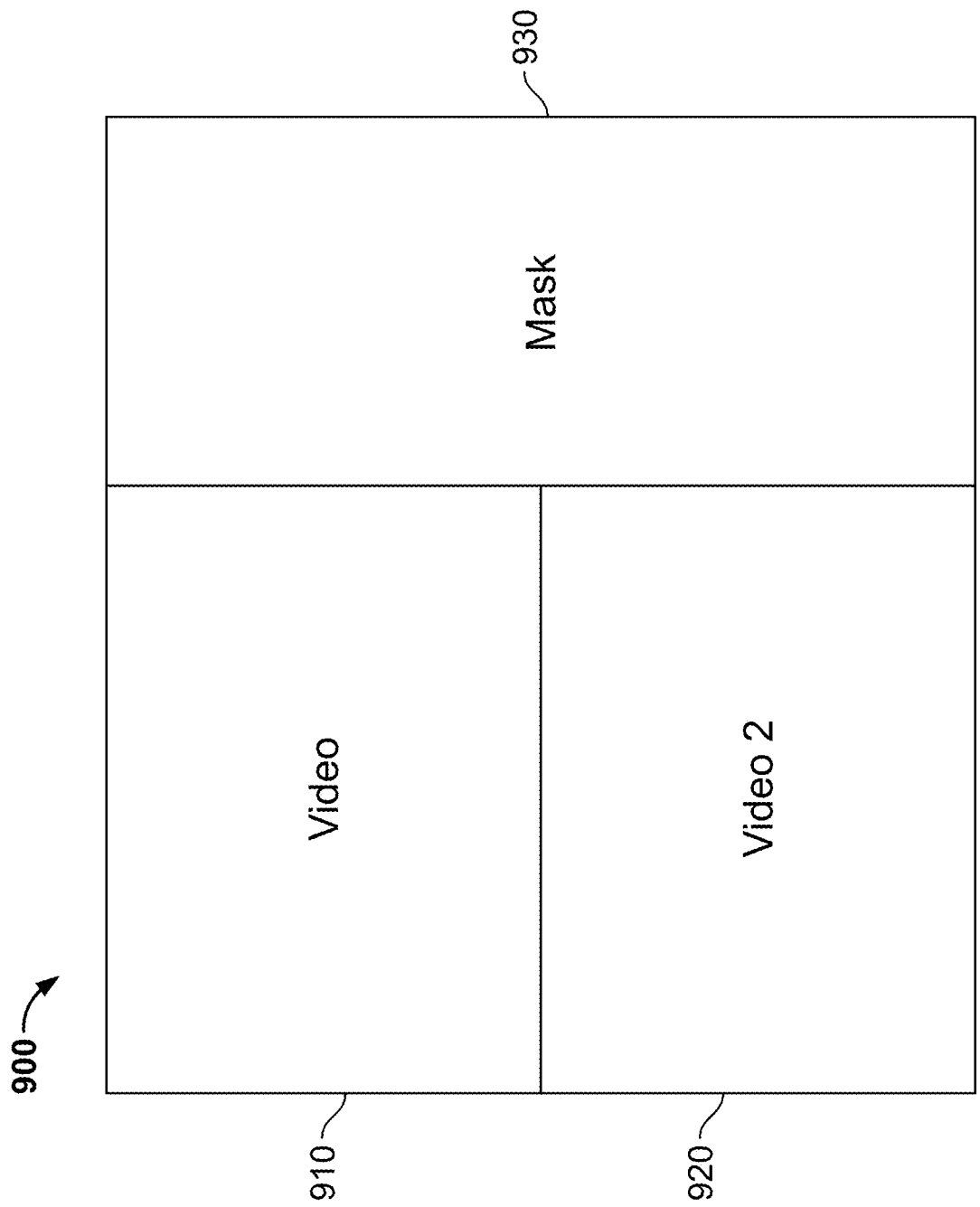
FIG. 9 depicts an example video frame with multiple video regions.

Other uses cases for the metadata encoded in pixels are contemplated. For example, in implementations where each pixel includes four channels (red, green, blue and alpha), with values ranging from 0 to 1, a value of {0, 0, 0, 0} can be used to specify that a portion of the video should be visible, whereas a value of {1, 1, 1, 1} can be used to specify that a portion of the video should be hidden. Other combinations of values can be used to provide more complex masks. Referring to FIG. 9, video frame 900 includes two separate video regions: video region 910 and video region 920. Video frame 900 also includes mask region 930. Video region 910 is the visible region when the video including video frame 900 is playing. In real-time, while the video is playing, mask 930 is rotated and aligned over video region 910. The metadata pixel values in the mask 930 are then used to determine whether the corresponding portion of video region 910 or the corresponding portion of video region 920 is shown. In this manner, shader operations can in real-time form a video that simultaneously displays a combination of portions of different videos. In another implementation, the metadata pixel values are used to determine whether to combine video region 910 and video region 920 together. In another implementation, the metadata pixel values are used to identify a type of color correction operation or graphical stylistic effect to be applied to the video. It should be noted that FIG. 9 is exemplary, and a video frame can include one or more video regions (e.g., one, two, three or more) and one or more metadata or mask regions (e.g., one, two, three or more). Different video frames can have different numbers of video regions and metadata regions, and different video or mask data within the regions.

Although the systems and methods described herein relate primarily to audio and video playback, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions. Alternatively or in addition, audio, video and other media can be stored as files in individual or combined form, and can be stored locally on a user's device or remotely on a server that transmits or streams the files to the user device.

While various implementations of the present invention have been described herein, it should be understood that they have been presented by example only. For example, one of skill in the art will appreciate that the techniques for creating seamless audio segments can be applied to creating seamless video segments and other forms of seamless media as well. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

The invention claimed is:

1. A computer-implemented method for real-time video manipulation, the method comprising:
  receiving a video comprising a plurality of frames, wherein each frame has a frame configuration with a frame boundary that contains a viewable region including video content that is intended to be visible and a non-viewable region including information that is intended to be non-visible when the video content is presented to users, the non-viewable region being adjacent to, and non-overlapping with, the viewable region in the frame configuration, wherein the viewable region occupies a first portion of the frame and the non-viewable region is positioned to fill a remaining portion of the frame within the frame boundary; and
  for each frame of the plurality of frames, in real time while the video is playing:
    separating the viewable region of the frame from the non-viewable region of the frame;

modifying at least part of the viewable region of the frame based on the information of the non-viewable region of the frame, thereby generating a modified version of the frame; and displaying the modified version of the frame within the video.

2. The method of claim 1, wherein the information of the non-viewable region of the frame comprises a mask.

3. The method of claim 2, wherein modifying the at least part of the viewable region of the frame comprises:
using the mask to identify one or more areas in the viewable region of the frame; and
performing a graphical operation on the one or more areas.

4. The method of claim 3, wherein the graphical operation comprises a shader operation.

5. The method of claim 3, wherein performing the graphical operation on the one or more areas comprises:
providing, as input to an algorithm, a color associated with a pixel within the one or more areas;
receiving, as output from the algorithm, a replacement color; and
modifying the pixel to have the replacement color.

6. The method of claim 2, wherein the mask is rotated relative to the viewable region of the frame.

7. The method of claim 2, wherein the mask is the same in each frame of the plurality of frames.

8. The method of claim 2, wherein the mask differs between at least two frames of the plurality of frames.

9. The method of claim 1, wherein the viewable region of the frame is larger than the non-viewable region of the frame.

10. The method of claim 1, wherein the viewable region of the frame comprises a first viewable region, and wherein the frame further comprises a second viewable region, and wherein the first viewable region and the second viewable region are manipulated with respect to each other based on the information in the non-viewable region of the frame.

11. A system for real-time video manipulation, the system comprising:
at least one memory for storing computer-executable instructions; and
at least one processor for executing the instructions stored on the memory, wherein execution of the instructions programs the at least one processor to perform operations comprising:
receiving a video comprising a plurality of frames, wherein each frame has a frame configuration with a frame boundary that contains a viewable region including video content that is intended to be visible and a non-viewable region including information that is intended to be non-visible when the video content is presented to users, the non-viewable region being adjacent to, and non-overlapping with, the viewable region in the frame configuration, wherein the viewable region occupies a first portion of the frame and the non-viewable region is positioned to fill a remaining portion of the frame within the frame boundary; and
for each frame of the plurality of frames, in real time while the video is playing:
separating the viewable region of the frame from the non-viewable region of the frame;
modifying at least part of the viewable region of the frame based on the information of the non-viewable region of the frame, thereby generating a modified version of the frame; and
displaying the modified version of the frame within the video.

12. The system of claim 11, wherein the information of the non-viewable region of the frame comprises a mask.

13. The system of claim 12, wherein modifying the at least part of the viewable region of the frame comprises:
using the mask to identify one or more areas in the viewable region of the frame; and
performing a graphical operation on the one or more areas.

14. The system of claim 13, wherein the graphical operation comprises a shader operation.

15. The system of claim 13, wherein performing the graphical operation on the one or more areas comprises:
providing, as input to an algorithm, a color associated with a pixel within the one or more areas;
receiving, as output from the algorithm, a replacement color; and
modifying the pixel to have the replacement color.

16. The system of claim 12, wherein the mask is rotated relative to the viewable region of the frame.

17. The method of claim 12, wherein the mask is the same in each frame of the plurality of frames.

18. The system of claim 12, wherein the mask differs between at least two frames of the plurality of frames.

19. The system of claim 11, wherein the viewable region of the frame is larger than the non-viewable region of the frame.

20. The system of claim 11, wherein the viewable region of the frame comprises a first viewable region, and wherein the frame further comprises a second viewable region, and wherein the first viewable region and the second viewable region are manipulated with respect to each other based on the information in the non-viewable region of the frame.

* * * * *